United States Patent [19]

Kostresti et al.

[11] Patent Number: 5,822,324

[45] Date of Patent: Oct. 13, 1998

[54] SIMULCASTING DIGITAL VIDEO PROGRAMS FOR BROADCAST AND INTERACTIVE SERVICES

[75] Inventors: Bruce Kostresti, Wheaton, Md.; Allan Schneider, Falls Church, Va.

[73] Assignee: Bell Atlantic Network Services, Inc., Arlington, Va.

[21] Appl. No.: 569,703

[22] Filed: Dec. 8, 1995

Related U.S. Application Data

[63] Continuation-in-part of Ser. No. 491,515, Jun. 19, 1995, Pat. No. 5,729,549, which is a continuation-in-part of Ser. No. 405,558, Mar. 16, 1995, Pat. No. 5,651,010.

[51] Int. Cl.[6] .................................................. H04N 7/173
[52] U.S. Cl. .............................................. 370/487; 370/522
[58] Field of Search ................................... 370/485–487, 370/496, 522, 523, 535, 537, 538; 348/6, 7, 12, 13, 21, 423, 385, 387; 455/4.1, 4.2, 3.1, 5.1, 414, 503; 364/514 A, 514 R; 379/58–60; 375/222

[56] References Cited

U.S. PATENT DOCUMENTS

| | | |
|---|---|---|
| 2,629,816 | 2/1953 | Rabuteau . |
| 3,836,726 | 9/1974 | Wells et al. . |
| 4,255,814 | 3/1981 | Osborn . |
| 4,658,096 | 4/1987 | West, Jr. et al. . |
| 4,718,109 | 1/1988 | Breeden et al. . |
| 4,750,036 | 6/1988 | Martinez . |
| 4,752,954 | 6/1988 | Masuko . |
| 4,825,457 | 4/1989 | Lebowitz ................................ 379/59 |
| 4,916,532 | 4/1990 | Streck et al. . |
| 4,939,726 | 7/1990 | Flammer et al. . |
| 5,007,052 | 4/1991 | Flammer . |
| 5,038,403 | 8/1991 | Leitch . |
| 5,079,768 | 1/1992 | Flammer . |
| 5,101,499 | 3/1992 | Streck et al. . |
| 5,115,433 | 5/1992 | Baran et al. . |
| 5,117,503 | 5/1992 | Olson . |
| 5,127,101 | 6/1992 | Rose, Jr. . |
| 5,128,925 | 7/1992 | Dornstetter et al. . |
| 5,130,987 | 7/1992 | Flammer . |
| 5,177,604 | 1/1993 | Martinez . |
| 5,230,086 | 7/1993 | Saul . |
| 5,231,494 | 7/1993 | Wachob . |
| 5,239,671 | 8/1993 | Lindquist et al. . |
| 5,239,672 | 8/1993 | Kurby et al. . |
| 5,243,598 | 9/1993 | Lee . |

(List continued on next page.)

OTHER PUBLICATIONS

"The Ricochet Network", authored by Metricom. (prior to Applicants' invention).

*Primary Examiner*—Chau Nguyen
*Attorney, Agent, or Firm*—McDermott, Will & Emery

[57] ABSTRACT

To provide interactivity, data communication through wireless telephone network (e.g. cellular) is combined with a broadband digital transmission through a broadcast network. In the preferred embodiment, the broadcast network utilizes multiple transmitters at separately located sites simultaneously broadcasting the same multi-channel, multi-program signal. Broadcast waves from the transmitters propagate throughout substantially overlapping portions of the service area. Customer premises receiving systems include a receiving antenna and one or more digital entertainment terminals. The terminal includes a channel selector and digital receiver for capturing a digital transport stream from a selected channel. A processor converts selected program information from the transport stream for presentation, e.g. via a television set. The terminal also includes a CPU controlling the operation of the channel selector and the processor in response to user inputs. The CPU also communicates signaling information for interactive services via a data modem and a wireless telephone transceiver included in the terminal and the wireless telephone network. The terminal may also include a telephone interface that permits standard customer premises telephones to send and receive calls using the wireless telephone transceiver, thus providing a bypass of local loop services marketed by a telephone company.

56 Claims, 12 Drawing Sheets

U.S. PATENT DOCUMENTS

| | | |
|---|---|---|
| 5,268,933 | 12/1993 | Averbuch . |
| 5,274,666 | 12/1993 | Dowdell et al. . |
| 5,321,514 | 6/1994 | Martinez . |
| 5,343,239 | 8/1994 | Lappington et al. . |
| 5,355,529 | 10/1994 | Lindquist et al. . |
| 5,394,559 | 2/1995 | Hemmie et al. . |
| 5,396,546 | 3/1995 | Remillard . |
| 5,400,338 | 3/1995 | Flammer, III . |
| 5,404,393 | 4/1995 | Remillard . |
| 5,404,575 | 4/1995 | Lehto . |
| 5,418,559 | 5/1995 | Blahut . |
| 5,437,052 | 7/1995 | Hemmie et al. . |
| 5,526,034 | 6/1996 | Hoarty et al. ............................. 348/7 |
| 5,572,442 | 11/1996 | Schulhof et al. ...................... 455/4.2 |
| 5,572,517 | 11/1996 | Safadi ................................... 370/431 |

…

SIMULCASTING DIGITAL VIDEO PROGRAMS FOR BROADCAST AND INTERACTIVE SERVICES

CROSS-REFERENCE TO RELATED APPLICATION

This application is a continuation in part of U.S. patent application Ser. No. 08/491,515 filed Jun. 19, 1995 now U.S. Pat. No. 5,729,549, entitled "SIMULCASTING DIGITAL VIDEO PROGRAMS FOR BROADCAST AND INTERACTIVE SERVICES" which is a continuation in part of U.S. patent application Ser. No. 08/405,558 filed Mar. 16, 1995, now U.S. Pat. No. 5,651,010, entitled "SIMULTANEOUS OVERLAPPING BROADCASTING OF DIGITAL PROGRAMS", the disclosures of which are incorporated herein in the entirety by reference.

TECHNICAL FIELD

The present invention relates to wireless distribution of program information, e.g. video, audio and data. More specifically, the present invention relates to a broadband network providing substantially concurrent distribution of multiple RF channels from separately located transmitters, each RF channel carrying a digital transport stream containing multiplexed data relating to a plurality of different programs, in combination with cellular wireless transport of signaling information for data and interactive services and of voice telephone communications.

BACKGROUND ART

"Wireless cable" is a term usually used to refer to a multi-channel video distribution medium that resembles franchise cable television, but which uses microwave channels rather than coaxial cable or wire to transmit programming to the subscriber. Programming for wireless cable systems is received at the headend of the wireless cable system in the same manner as it is for landline based cable television. These programs are then retransmitted, utilizing the high end of the Ultra High Frequency (UHF) portion of the microwave radio frequency spectrum (2.1 to 2.7 GHz), by a microwave transmitting antenna located on a tower or other tall structure to small antennas on subscriber rooftops, typically within a 40 mile radius.

At the subscriber's location, microwave signals are received by an antenna, down-converted and passed through conventional coaxial cable to a descrambling converter located on top of a television set. The signals are converted at the antenna location to lower frequencies in order to be carried over conventional in-house cable to a converter box, decoded and then output to a standard television set. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

In a typical prior art system, such as shown in FIG. 1, a headend system H receives a number of analog television program signals from a variety of satellite down-link receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system upconverts the combined spectrum signal to the UHF frequency range, typically centered around 2.6 Ghz. The headend system supplies the UHF signal to a single transmitter antenna tower T which broadcasts the signal to subscribers who each have an individual home receiving system.

Interactivity requires use of separate telephone line communications, and as a result, typically is very limited. For example, a subscriber can call in to the headend to order pay-per-view events via the telephone network, and the headend transmits one or more codes to the subscriber's receiver system to enable descrambling of encoded pay-per-view programs. Telephone line data communications associated with video programming also can provide interactivity, for example to permit ordering of items presented on home shopping channels.

If the telephone line communication involves data reporting, e.g. transferring records of programs viewed to the headend, then a modem in or associated with the converter/descrambler box can transfer the information via a telephone line at some time not typically used for normal telephone conversation, for example between 2:00 AM and 4:00 AM. Such off-hours telephone line communications, however, do not offer real time interactivity.

Proposals have been made to provide a wireless signalling channel for use with the wireless cable service (see e.g. U.S. Pat. Nos. 5,394,559 and 5,437,052 to Hemmie et al.) . Specifically, the proposed system would use bandwidth otherwise allocatable to video channels to provide a shared use return data channel for upstream interactive signaling. This type of proposal, however, utilizes an extremely scarce resource, i.e. available channel capacity, and would require FCC authorization. Use of such a channel with a shared transmit and receive antenna also would be subject to cross-talk interference, unless substantial guard-bands were provided. Substantial guard-bands, however, further reduce available channel capacity. Furthermore, the return channel and equipment for processing signals on that channel are dedicated to the interactive portion of the wireless cable video service. As a financial matter, this approach forces the wireless video services to support the entire cost of the associated infrastructure. At least initially, the number of subscribers actually using interactive services will not provide sufficient revenue to support the cost of the wireless back-channel equipment.

From the discussion above, it should be clear that a need exists for a cost effective system for providing real-time interactive services in combination with a wireless cable television system. Also, the communication industry is going through a period of deregulation, one consequence of which is that a number of monopoly service markets have been or soon will be opened to competition. For example, companies such as local telephone companies are entering the cable television market. Similarly, cable system operators are attempting to upgrade their networks to offer local telephone services in competition with the local telephone companies. In such a competitive market place, it would be advantageous to the company offering the wireless cable service to package that service with some form of competitive telephone service, preferably in some manner providing a bypass of a portion or all of the local telephone company network.

A variety of other needs arise out of the number and transmission characteristics of the channels utilized for wireless cable type services, as discussed below. FIG. 1A shows a typical service area for a wireless cable type system of the type shown in FIG. 1. In accord with relevant regulations, the wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel (s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at the customer location by direct line-of-sight (LOS) transmission. Typically an elliptical dish shaped antenna 18–36 inches long, formed of parallel curved elements, is aimed from the subscriber location to receive the strongest signal from the transmitter. The captured signals are down-converted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

Propagation characteristics at the relevant UHF operating frequencies require clear line-of-sight (LOS) between the transmit and receive antennas for reliable service reception. Both natural obstructions such as hills and vegetation, and man-made obstructions such as buildings, water towers and the like, limit the actual households capable of receiving an LOS transmission. FIG. 1A shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low, necessitating use of a large number of repeaters. Also, because of delays and multipath effects, repeater transmissions may interfere with reception from the primary source in areas close to the blockage area B. Overcoming blockages using repeaters together with the necessity for minimizing the attendant distortions that result when amplifying combined RF channels would therefore require an inordinate number of repeaters.

In the industry, a nominal figure for households reachable by LOS is 70%, even with a small, commercially practical number of repeaters. This projected number, however, is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna and using relatively low roof-mounted receiving antennae wherever possible.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., temperature or pressure inversions. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIGS. 2 and 3. The related systems are described in U.S. Pat. Nos. 3,836,726, issued September 1974 and 5,038,403 issued Aug. 6, 1991. FIG. 2 illustrates a system utilizing sequencing while FIG. 3 illustrates a system utilizing simulcasting. As can be seen, the aim is to cover a maximum area with minimum areas of signal overlap. Even if someone suggested application to UHF Wireless Cable type communications, such propagation fields would still exhibit the above noted problems due to obstructions, multi-path interference and fading.

The allocation of channel capacity has also limited the number of program services and thus the market acceptability of wireless cable television systems. To help understand this additional problem, the evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. The new rules reallocated eight of those channels for outright commercial use, and educational organizations were permitted to lease excess hours on the remaining 20 channels to commercial operators. In any local market, this makes it possible for a commercial operator to combine available time on any or all of those 28 channels with five other channels already available for commercial use. Thus, under the current FCC rules, the available spectrum results in a maximum of 33 analog channels. This number of 'wireless cable' channels is less than the number offered on many competing franchise type cable television systems.

Since 1983 spectrum blocks in the 2.1–2.7 Ghz range have been allocated for the purpose of delivering video content from a single transmit site to multiple receive locations. A total of 198 Mhz has been allocated for downstream transmissions for the wireless cable service. The channelization and transmission modulation (6 Mhz amplitude modulation/vestigial side band) are equivalent to broadcast TV or cable but up-converted to the assigned microwave frequencies.

The relevant portion of the UHF spectrum was originally licensed in blocks of four video channels each separately licensed, with each block allocated to a specific purpose. Five blocks, each with four channels, were allocated to Instructional Television Fixed Service (ITFS). Two blocks of four channels were made available to anyone wishing to provide an alternative multi-channel video program service. The final four channels were licensed individually to institutions for the purpose of providing a private video network. Through licensing and leasing arrangements, the FCC now allows all of the channels to be aggregated for the purpose of providing an alternative to cable television.

The 33 channels potentially available to wireless cable operators thus are subdivided into two types of channels. Twenty channels are referred to as ITFS. The remaining 13 channels are generally referred to as Multi-channel Multipoint Distribution Service (MMDS).

In many ways, current typical UHF wireless TV is equivalent to a low tier franchise cable television system (i.e. having relatively few channels), with the only real difference lying in the medium used to transport signals from the headend to the customer. The available spectrum limitation to a maximum of 33 analog channels (or less in any given market area), however, permits far fewer programs on a wireless cable system than the number currently offered on many competing franchise type cable television systems.

Clearly an additional need exists for a broadband broadcast system providing increased propagation coverage and reduced areas of blockages for broadcast video services and/or interactive service video signals. Any such system should also provide an increased number of video programs, without requiring additional spectrum allocation for the broadband transmissions. The system should provide good signal quality throughout the entire reception area or service area. Accordingly, it is also desirable to minimize multipath interference and loss of service due to fading.

DISCLOSURE OF THE INVENTION

The present invention provides methods, systems and terminal devices to address the above stated needs. The present invention contemplates combining a multi-channel broadband digital wireless broadcasting network with selective call connections through an existing public wireless telephone network. In the preferred embodiment, the wireless network is a cellular network, such as those currently used for mobile and portable cellular telephone services and for PCS (personal communication service). Subscribers terminals include means for processing selected broadband information from one of the channels to present broadband information, as well as a wireless (e.g. cellular) telephone type transceiver and a data modem. The transceiver and modem provide wireless communication of signaling messages to and from the terminals via the public cellular telephone network.

The terminal also includes a telephone interface, coupling standard telephone type devices at the customer premises to the cellular transceiver. The interface and transceiver allow a person at the subscriber premises to operate a normal telephone type device to call out and receive calls through the cellular telephone network. By reselling cellular telephone services as part of a package with the interactive wireless cable service, the wireless cable operator can offer its subscribers a bypass service, effectively bypassing at least the local loop services of the local telephone company.

The preferred embodiment of the communication system utilizes a digital simulcasting system to broadcast the broadband information. A signal including multiplexed channels is transmitted simultaneously from a plurality of spaced transmitting sites. The transmitting sites propagate the signal into substantially overlapping regions of at least a major portion of the intended reception area. At the subscriber premises, a terminal device receives the transmitted signal. At least a portion of the received signal is processed to acquire a digital transport stream from a selected one of the multiplexed channels. At least a portion of the transport stream is presented, e.g. in a form that is sensorially perceptible to a user.

The overlapping transmissions or propagation areas reduce or eliminate blockage zones and effects of fading. This technique also limits the number of receivers effected by equipment outages. Typically, a directional receiving antenna can be aimed toward at least one strong line-of-sight transmission source.

To increase the number of programs broadcast by a system operating in accord with the above simulcasting method, each of the multiplexed channels carries a multiplexed stream (transport stream) of digital data representing a plurality of programs. The programs may be audio or data, but in the currently preferred embodiment, a number of the broadcast programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

Interactive services can be provided via the two-way signaling communication through the cellular telephone network. For example, the user can send selections or other inputs upstream through that network, and the terminal will receive low speed information for processing and/or presentation to the user. The information may be displayed as text or graphics overlays on broadband video information being output by the terminal.

Alternatively, broadband downstream information may be transmitted to the terminal via one of the broadcast channels. However, to service a large number of subscribers through a limited number of broadcast channels, each terminal typically receives less than the equivalent of a full motion video program. One terminal selectively may receive a short sequence of full motion video, a sequence of frames producing limited motion, one or more frames for selective still or freeze frame type display or combinations of short full motion segments, limited motion segments and still frames.

The provider of a broadband interactive service may broadcast frames in a cyclically repeating sequence, sometimes referred to as a data carousel. The terminal monitors packet identifiers in the sequence and captures packets having specified identifiers to obtain the data for selected frames. Alternatively, the provider may assign a packet identifier to a terminal for the duration of an interactive session and transmit selected information to that terminal in packets bearing the assigned identifier.

The interactive service features of the present invention may also provide a unique form of access to the Internet. A headend system providing signals relating to interactive services includes an Internet interface. In this implementation, the signaling link through the wireless telephone network provides a relatively low speed access to the Internet. However, the Internet interface also is coupled through a multiplexer to provide downstream transmission using one of the broadband transport streams. Bandwidth on the transport stream can be dynamically allocated in one of the manners described above to provide a temporary high-speed transport from a downstream port of the Internet interface to one of the receiver systems that requests information from the Internet.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

FIG. 6A depicts the structure of the headends, and FIG. 6B depicts the signal processing circuitry at the actual transmitter locations.

BEST MODE FOR CARRYING OUT THE INVENTION

The present invention contemplates the combination of a digital wireless video broadcasting system, carrying broadcast service signals and/or interactive service signals, together with selective call connections through an existing public wireless telephone network. The wireless telephone network supports normal wireless telephone services, e.g. from mobile or handheld cellular telephones, or PCS telephones, etc. In addition, terminals of the digital wireless video system include wireless telephone transceivers and modems for two-way data signaling through the wireless telephone network to a provider of the interactive video services.

Figure 4:
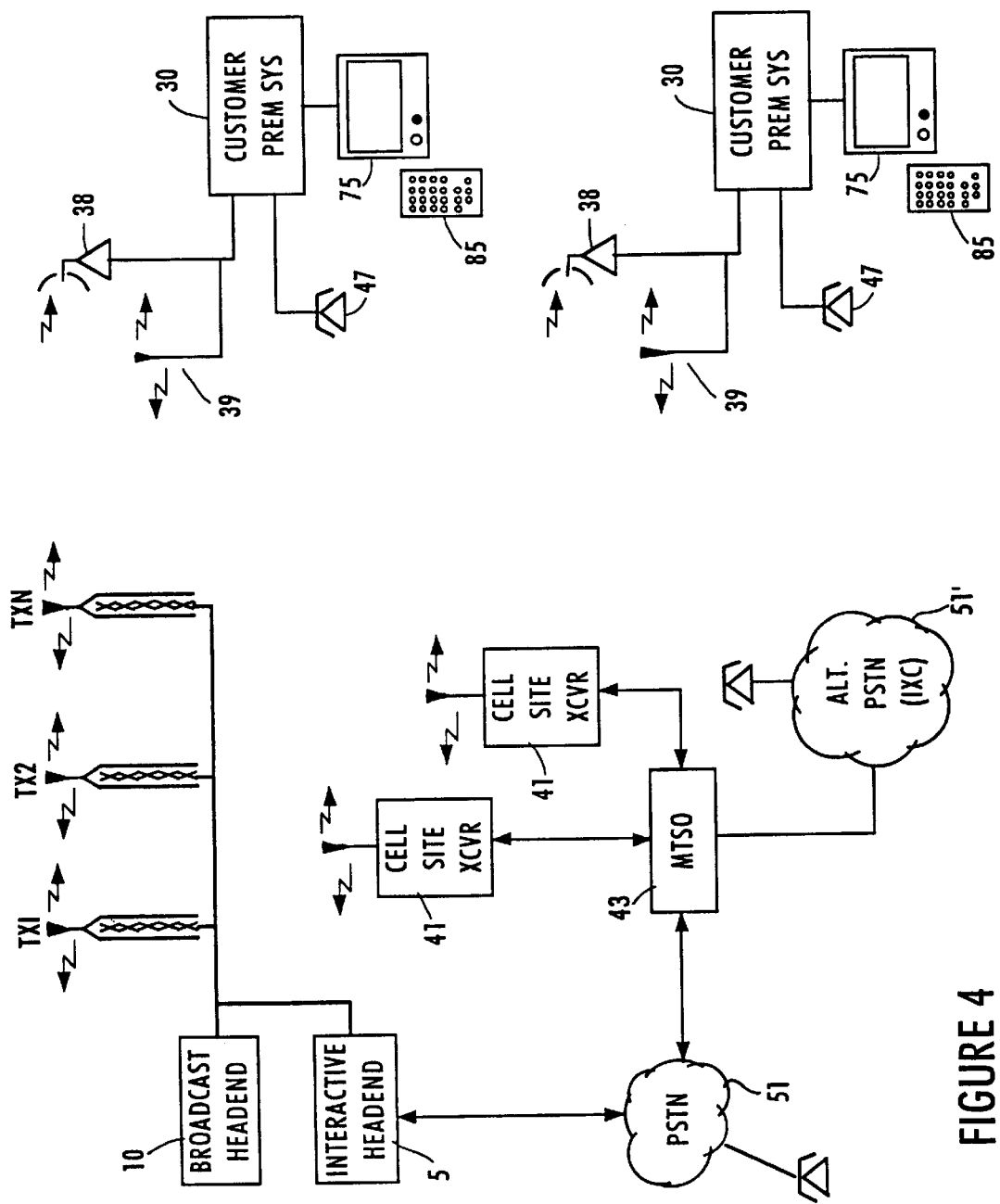
FIG. 4 is a simplified functional block diagram of a combined network comprising a digital video simulcasting system and at least a portion of a cellular telephone system in accord with the present invention.

FIG. 4 provides a high level functional block diagram of the combined video and data networks of the present invention. As shown, a broadcast headend 10 supplies a number of channels of digital broadcast video information to a plurality of transmitters TX1 to TXN for concurrent broadcasting. An interactive service headend 5 may also provide digital broadband information on one or more channels radiated together with the broadcast channels from the same transmitters and antennae. The two headends 5 and 10 may be separate as shown in FIG. 4 or combined into a single system.

The transmitters TX1 to TXN broadcast the broadband channels simultaneously into overlapping portions of a desired service area. A subscriber within the service area will have a directional receiving antenna 38 aimed at one of the transmitters TX1 to TXN. The antenna 38 supplies the broadband channels to a customer premises system 30 for processing. For broadband video signals, for example, the customer premises system 30 processes selected portions of the signals to produce audio/video signals for driving a standard television output device 75.

A variety of wireless telephone networks can be used. The preferred embodiment utilizes a 'cellular' type wireless telephone network. The term 'cellular' here encompasses any wireless telephone network organized to provide service in a geographic area through a series of base stations, each of which serves one portion or 'cell' of the service area. Common 'cellular' systems provide services marketed under names such as 'Cellular Telephone' service and 'PCS' service. To communicate via the cellular telephone network, the customer premises system 30 connects to a cellular telephone antenna 39 for signaling data calls and for telephone calls to and from customer telephone equipment 47.

The system shown in FIG. 4 includes at least a portion of a public cellular telephone data network. This network includes cellular base station type cell site transceivers 41, a mobile telephone switching office (MTSO) 43, landline connections between the transceivers 41 and the MTSO 43, and a landline connection from the MTSO to one or more switching offices of the public switched telephone network (PSTN) 51. Although not shown, portable cellular handsets and mobile cellular telephones all communicate via the cellular network and the PSTN in the normal manner. The PSTN also provides plain old telephone service to standard landline connected telephone devices. The PSTN 51 also provides a switched landline communication link to the interactive service headend system 5.

The MTSO 43 also preferably connects to an alternate PSTN network 51'. In a typical example, the network 51' is that of an interexchange carrier. As such, the MTSO and wireless cellular network provide connections for long distance calls through the IXC network 51'. In areas where another company offers landline services, the MTSO may provide additional connections for at least some calls via the alternate network 51'. The alternate network may also provide the connection to the interactive service headend 5.

The wireless cellular links at least bypass the local loop portion of the local telephone network for customers subscribing to cellular telephone service and/or the bypass service offered by the wireless cable operator. The switching through the MTSO to the network 51' may bypass the local PSTN 51 entirely for at least certain types of calls, such as long distance calls through an IXC network.

The customer premises system 30 is responsive to user inputs from a remote control device 85. These inputs include selection of available broadcast programs. These inputs also include signaling inputs related to interactive services.

In response to inputs relating to interactive services, the customer premises system 30 will initiate a cellular telephone call through a transceiver 41, the MTSO 43 and the PSTN 51 to the interactive headend. To the cellular components and the PSTN, this call is technically the same as any standard voice type cellular telephone call.

More specifically, when a user at one of the customer premises wants to initiate an interactive session, the user enters an appropriate command on the remote control 85. In response to the remote control signal, the customer premises system 30 activates its internal modem to dial a telephone number for the interactive headend 5. The modem supplies this number through an appropriate interface to a cellular transceiver within the system 30. The cellular transceiver communicates via wireless transmission and reception through antenna 39. Because the installation is fixed, the wireless communication will generally go through a single cell site transceiver 41 which serves the area in which the particular system 30 is located. In response to the telephone number, the transceiver in the customer premises system 30 initiates a signaling sequence with the serving cell site transceiver 41 and the MTSO 43 to obtain an available two-way wireless link through the transceiver and initiate a landline connection from the transceiver 41 through the MTSO 43 and the PSTN 51 to the interactive headend 5. The cellular telephone call is set up and provides the same two-way voice grade channel bandwidth as provided for a normal cellular telephone call from a cellular telephone.

The call results in a two-way communication link between the interactive headend and signaling data communication elements of the customer premises system 30. Once the signaling call to the headend 5 is set-up, a modem in the customer premises system transmits data messages to the headend 5 in response to user inputs. The modem also demodulates signaling data received from the headend 5 for further processing.

The cellular based two-way data communications provides relatively low data rate communications, compared to the broadband data rates for the video transmissions. The cellular network also permits voice grade telephone communications to and from subscriber premises telephone equipment 47.

In response to user inputs received via the cellular network and the PSTN 51, the interactive headend 5 may transmit selected information through one of the broadcast channels, as discussed more later. Alternatively, the interactive headend 5 may transmit interactive service data back through the PSTN 51. The PSTN in turn supplies the message to the MSTO for broadcast from the cell site transceiver 41 serving the particular subscriber via the dynamically assigned cellular channel. The subscriber's antenna 39 supplies the relevant RF spectrum signals, including the message, to the customer premises system 30 for demodulation and further processing.

The message information sent from headend 5 through the cellular link may control operation of a terminal device, e.g. to permit decryption of a pay-per-view program. Alternatively, the message data may relate to interactive data for display on the associated television set 75. For example, the data may produce a display of character information such as sports scores, overlaid on the displayed video information. The data may also produce displays of overlaid icons facilitating further inputs relevant to the interactive service.

The two-way signaling via the cellular telephone call facilitates interactive services requiring relatively low down-stream data rates, particularly for short term interactions. For example, this signaling could provide price information and ordering instructions for overlay on a home shopping channel, as well as a receipt type display after a user orders a product. This signaling may also permit a user to play along with a game show on one of the broadcast programs or to order selected sports scores for scrolling text display on the TV 75. The upstream signaling may also control transmission of information on one of the broadband channels, as discussed later.

The cellular telephone network elements of the system of FIG. 4 are not dedicated to the interactive service and already exist in most areas. The cellular network components will continue to support cellular telephone traffic in the normal manner. As such, the fees for interactive video services do not need to financially support the infrastructure for the two-way data signaling capability. Typically, broadband customers pay a monthly service charge for interactivity plus a per call charge for the duration of each interactive session. The per call charge includes cellular call charges plus some amount for the interactive service.

A more detailed description of the broadband signal transport in accord with the preferred embodiment follows.

In the preferred embodiment of the present invention, groups of broadband program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 Ghz), although other frequency channels could be used. Separately located transmitters simultaneously broadcast a UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 5A:
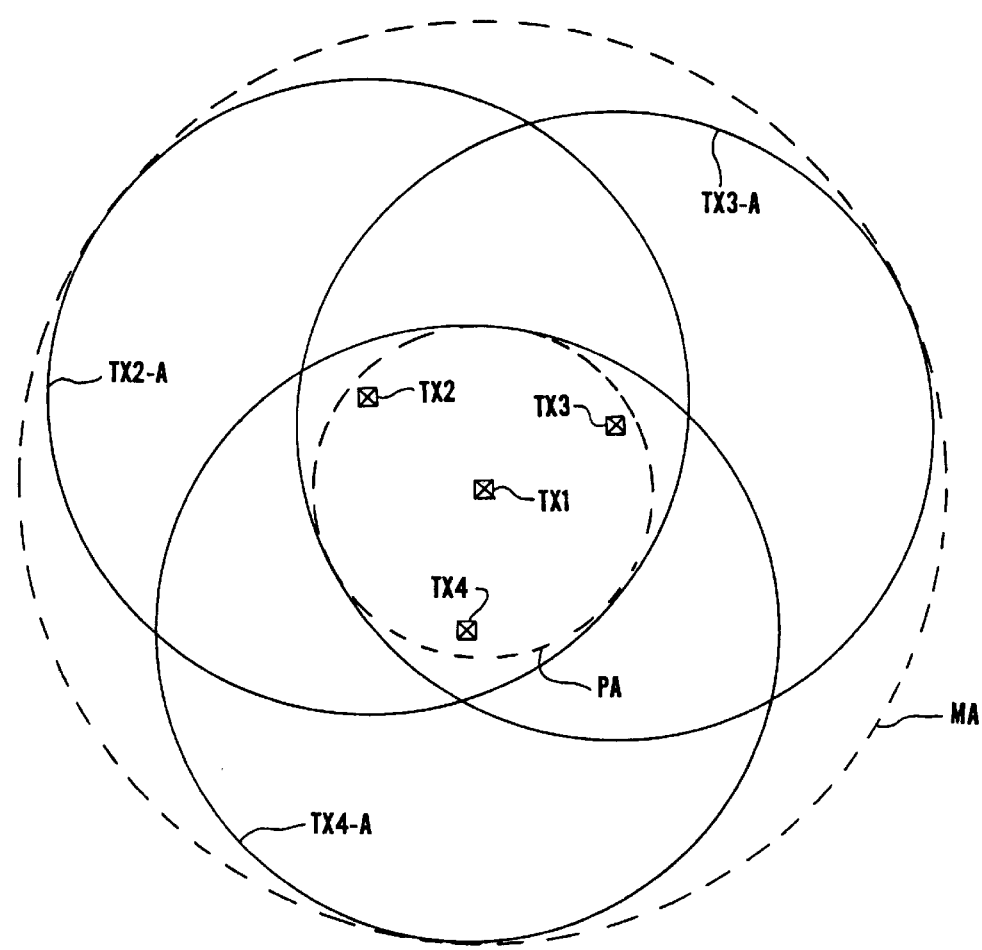
FIGS. 5A and 5B depict exemplary propagation areas for simulcast transmissions into a receiving area, in accord with the present invention.

Referring to FIG. 5A, the circle PA defines the Protected Area or primary area which may be serviced from a transmitting antenna TX1. At the present, the radius of this circle is 15 miles. However, usable signal and acceptable reception generally occurs to a radius of 40 miles, which here is defined by the circle MA indicating the Maximum Area. The region between the 15 mile radius and the 40 mile radius forms a 'secondary' service area. According to the invention, all or part of the rights of the educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 1:
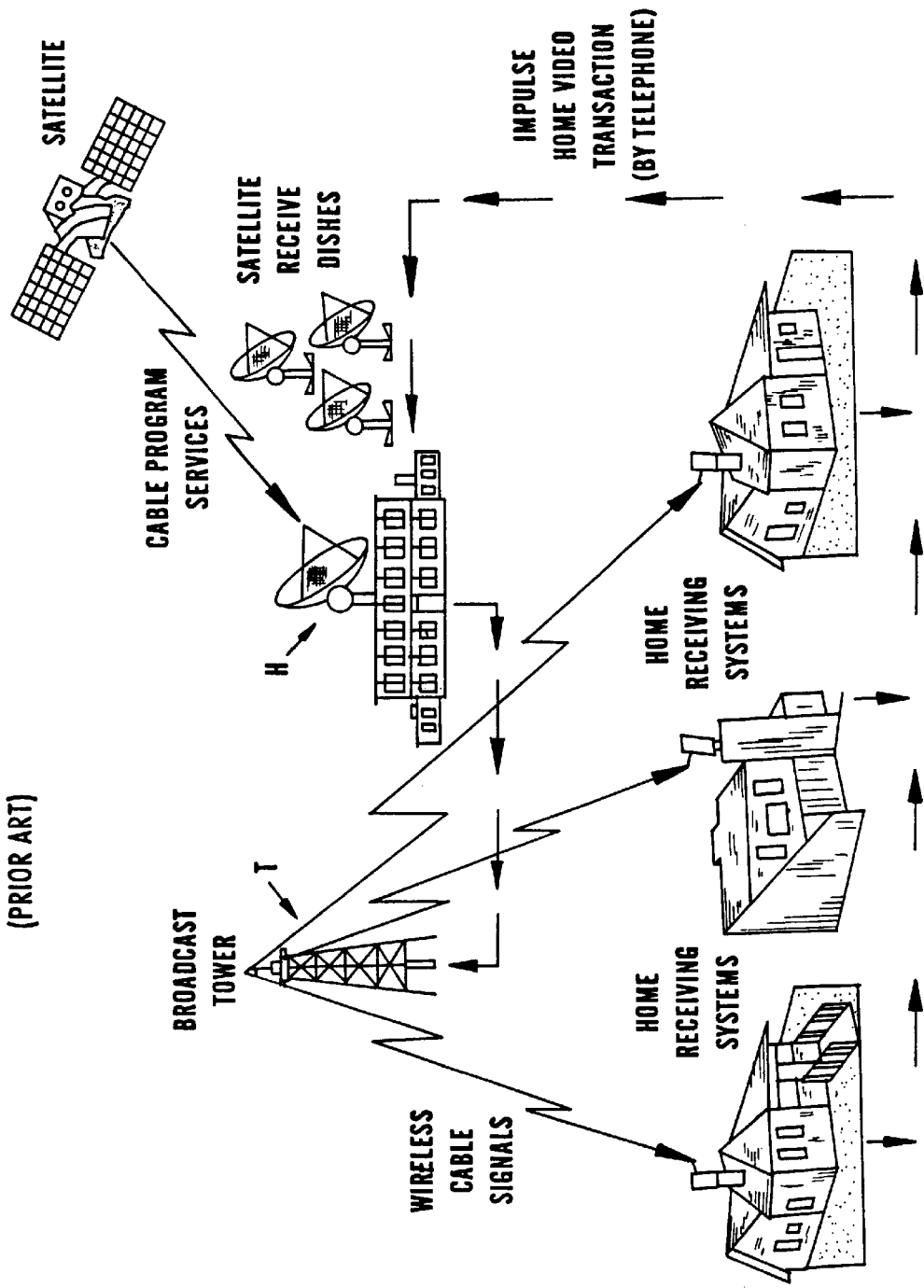
FIG. 1 is a simplified diagram of a prior art wireless cable television system.
Figure 1A:
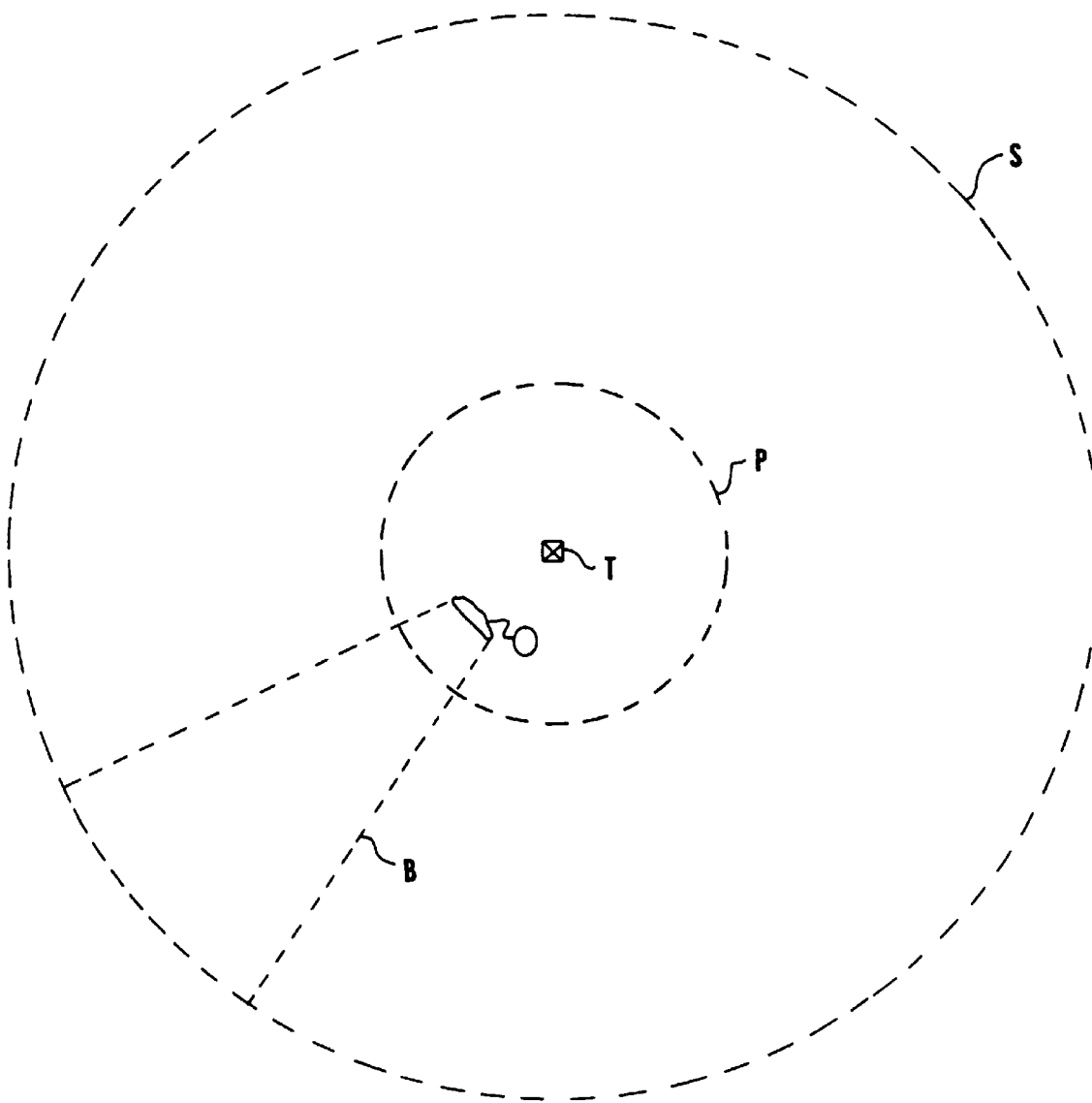
FIG. 1A shows service areas relating to a single wireless transmitter in the system of FIG. 1.

Referring to FIG. 5A there is shown one preferred embodiment of a simulcast arrangement utilizing the original antenna TX1 in addition to antennas TX2, TX3 and TX4 disposed in a generally triangular configuration within or on the boundary of the Protected Area (PA). According to this embodiment of the invention, all antennas radiate in an omni-directional pattern in azimuth as indicated by the circles TX2-A, TX3-A and TX4-A. The central antenna TX1 radiates out at a somewhat higher power to the maximum area MA, in a manner permitted by existing regulations, as discussed above relative to FIG. 1A. A major portion of the protected area (PA) is overlapped by the signals from all antennas TX1, TX2, TX3 and TX4. In the secondary area, between the Primary Area (PA) and the Maximum Area (MA), considerable overlap continues to exist but to a lesser extent. In this manner it has been found possible to reach receivers in approximately 90–95% of the maximum area (MA).

Figure 2:
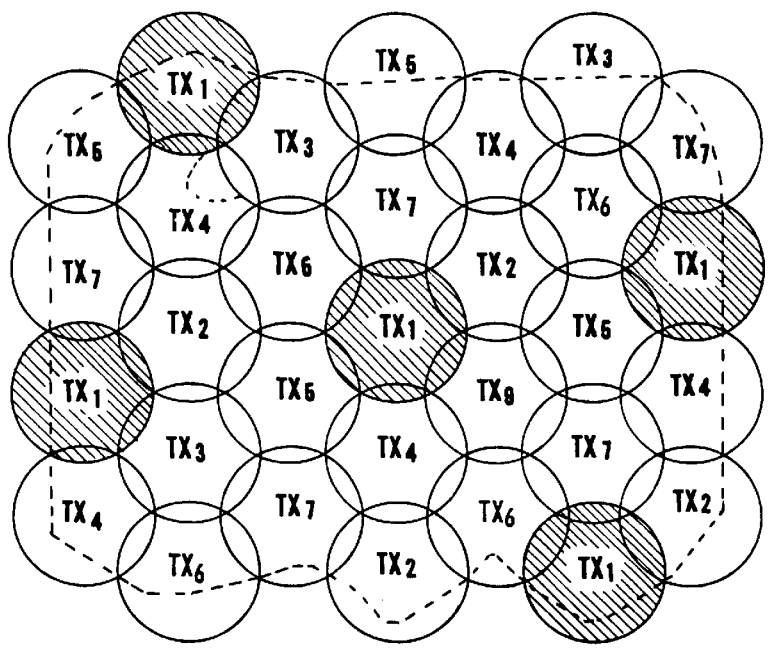
FIGS. 2 and 3 show propagation areas for multi-transmitter systems used in other types of prior art systems, e.g. paging.
Figure 3:
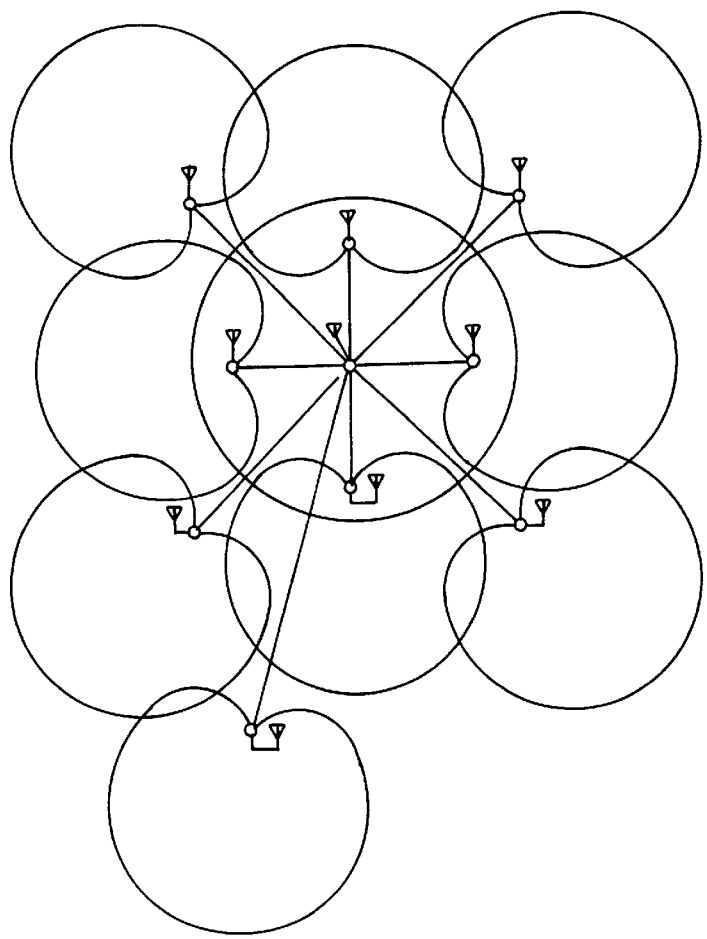
Figure 5B:
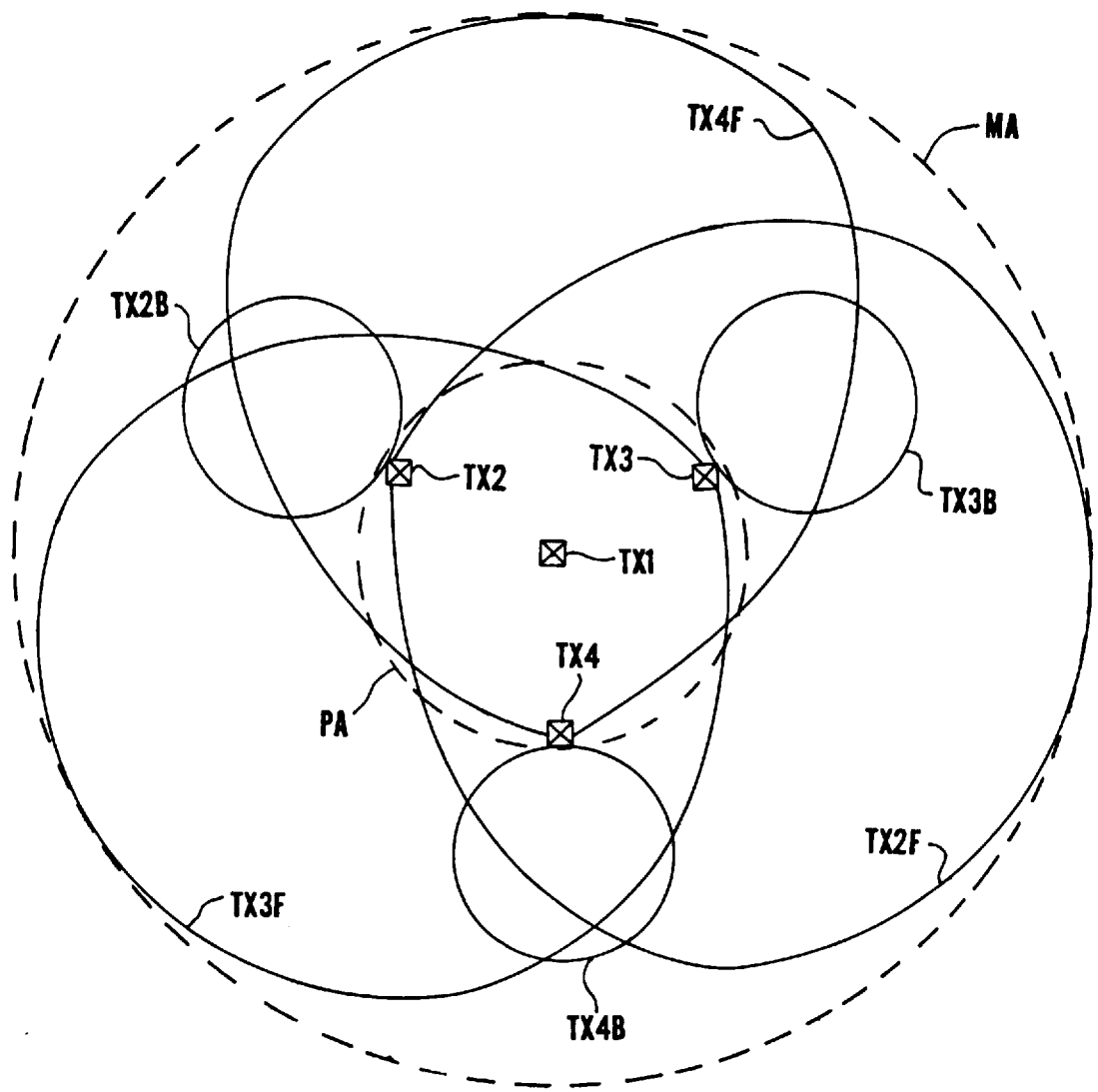

Referring to FIG. 5B, there is shown a second preferred embodiment of simulcasting utilizing directional antennas TX2, TX3 and TX4. In this embodiment the central antenna TX1 retains its omni-directional pattern. However, the antennas TX2, TX3 and TX4 are provided as directional antennas radiating forward and backward lobes TX2F and TX2B for the antenna TX2, TX3F and TX3B for the TX3 antenna and TX4F and TX4B for the TX4 antenna. In both the embodiments of FIGS. 5A and 5B it will be seen that there is a radical departure from the minimum overlap approach which is conventional in the systems illustrated in FIGS. 2 and 3.

In a typical installation, the broadband transmitters TX1 to TX4 all broadcast the same program signals at approximately the same time. The broadcasts from two or more of the transmitters may actually be simultaneous and in-phase with each other. Some of the broadband transmitters may broadcast the same signal but with predetermined time offsets between the actual radiations from the respective transmitter antennae, as discussed in more detail in U.S. patent application Ser. No. 08/441,976 filed May 16, 1995 entitled "SIMULCASTING DIGITAL VIDEO PROGRAMS" (attorney docket no. 680-130C), the disclosure of which is incorporated herein in its entirety by reference. The presently preferred timing relationships between the broadcasts from the multiple transmitters use zero offset, i.e. with all transmissions of the same signal occurring simultaneously and in-phase from all of the transmitter antennae.

Figure 6A:
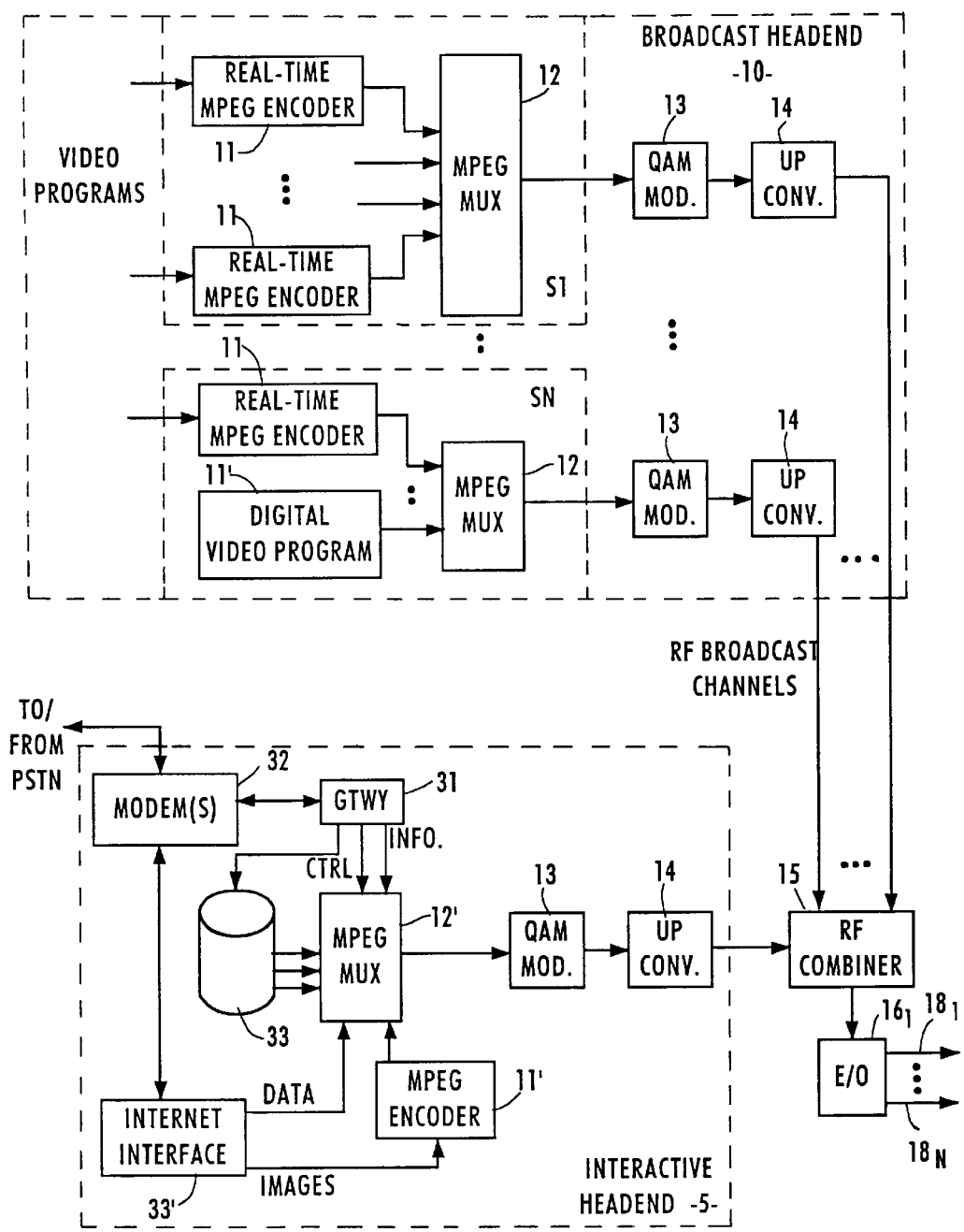
FIGS. 6A and 6B together depict in functional block diagram form the elements of the broadband transmission system used in accord with the present invention. In this regard.

With reference to FIG. 6A, the broadcasting portion of the system includes a broadcast headend 10. The broadcast headend 10 includes a number of Sources S1 to SN for producing digital transport streams, each of which contains a plurality of programs encoded as digital, compressed data. The number of such sources corresponds to the number of frequency channels available for broadcast service use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. As discussed below, in the preferred embodiment, one RF channel is reserved for broadband interactive services. The broadcast headend 10 therefore typically comprises 19–24 of the Sources S1 to SN, but may include as many as 33 such sources.

The Sources S1 to SN may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding.

FIG. 6A illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a super transport stream for transmission or storage.

Figure 6B:
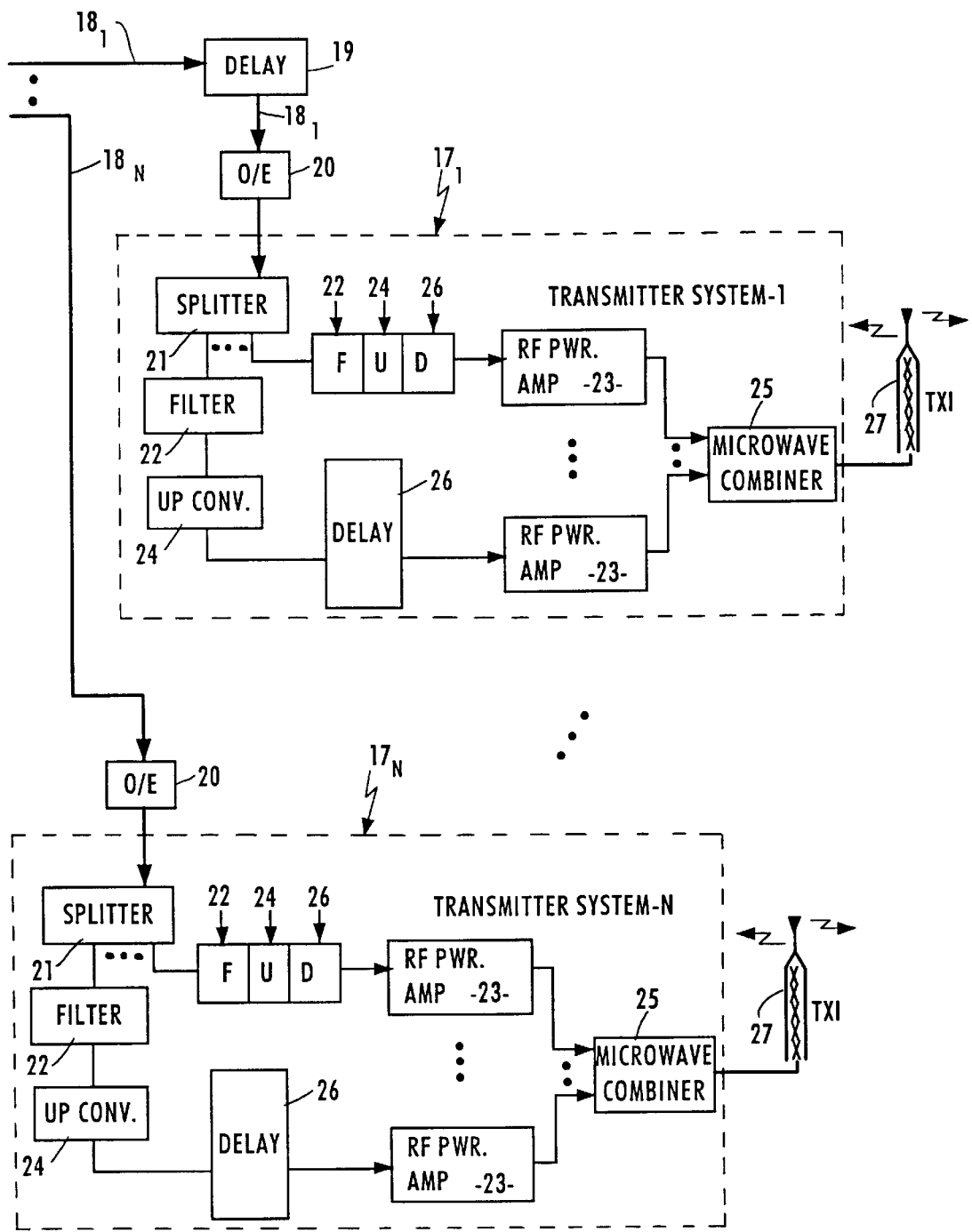
Figure 6C:
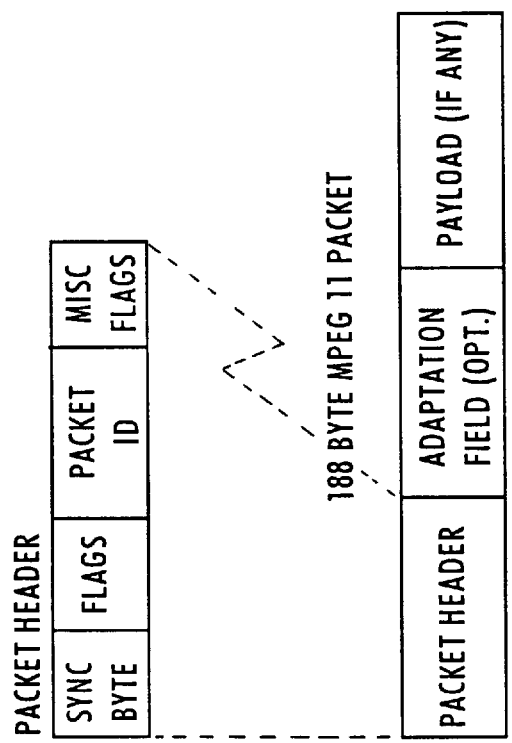
FIG. 6C shows an exemplary structure of an MPEG II type transport stream data packet broadcast by the system of FIGS. 6A and 6B.

Each frame of compressed program information (audio, video or data) is broken down into a series of transport packets. Although the frames can vary in length, e.g.

between a full reference I-frame and a delta B-frame, the transport packets have a fixed 188 byte size (see FIG. 6C). Thus, different frames are broken down into different numbers of MPEG transport packets. For example, in a 6 Mbits/s encoding system, a group of frames consisting of a total of 15 frames for one-half second of video (one I frame and a number of P and B frames), breaks down into approximately 2000 transport packets (or 4000 packets per second).

As depicted in FIG. 6C, each 188 byte transport stream packet consists of at least two sections, a 4 byte packet header section and either one or both of an optional adaptation field of variable length and/or a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in only 10 out of every 4000 video transport packets.

When included, the optional adaptation field includes a section for miscellaneous flags, such as discontinuity counter, private data flag, etc. One of the possible flags carried in this portion of the adaptation field is a program reference clock (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packets from a plurality of programs. In the present system, the encoders 11 (FIG. 6A) supply MPEG packet streams for multiple programs to an MPEG multiplexer 12. The number of programs may vary depending on the channel bandwidth and the encoding bit rate for each program. The MPEG multiplexer 12 may receive digitized and compressed (MPEG) video from other digital sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of payload capacity. A mixture of program streams for individual programs at different individual rates, e.g. 1.5 Mbits/s, 3 Mbits/s and 6 Mbits/s, are combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel, even though some bit stuffing or padding is necessary to fill the 27 Mbits/s payload capacity. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In an MPEG II super transport stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) associated with the HBO program. The program map for Showtime in the packet with PID 87 would then identify the PID numbers for the actual packetized elementary streams (PES) for the video, audio and data (if any) associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the stream with dummy packets to reach the full 27 Mbits/s). The actual stream will include an additional 3 Mbits/s of forward error correction information for a combined rate of 30 Mbits/s, although hereinafter for convenience the bit stream is generally described by its 27 Mbits/s payload rate.

The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1' (HBO) with PID value 132 indicating that the program map for HBO is contained in repeating packets identified by PID 132. Similarly, the program association table would map program number '2' (Showtime) with PID value 87 indicating that the program map for Showtime is contained in repeating packets identified by PID 87.

As discussed in more detail below, reception of a particular digital program requires that the CPE terminal device know the RF channel transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s payload (actually 30 Mbits/s including forward error correction bits) baseband digital output of each MPEG multiplexer 12 from one of the sources S1 to SN goes to a modulator 13. A variety of modulators may be used. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard 6 Mhz channel allocation for transmission over a cable television type distribution network. The currently preferred implementation uses 64 QAM (quadrature amplitude modulation) or VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s together with 3 Mbits/s of forward error correction information can be modulated into one 6 Mhz bandwidth analog channel. Higher or lower rates of forward error correction may be used, and a specific forward error correction technique is selected to provide optimum transport through the wireless broadband medium. The choice of the forward error correction bit rate will result in an inverse modification in the maximum payload rate. Also, 256 QAM or 16 VSB would yield up to 40 Mbits/s of payload capacity (not counting bits added for forward error correction), e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter 14 converts the frequency of the QAM modulated signal up to one of up to thirty-three RF channel frequencies in the 50–450 Mhz range. The upconverter 14 may be an element of the QAM modulator 13 or a separate element as shown hard wired to process the output of the respective QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

FIG. 6A also illustrates the structure of an exemplary interactive service headend 5. As shown, the interactive service headend 5 includes a server 33. The server 33 stores a variety of video information in MPEG II encoded form.

Although theoretically the server could store and transmit full motion movies or other videos on demand, as a practical matter, there are too few RF channels available to make such bandwidth intensive interactive services available through the wireless network here under consideration. In the presently preferred embodiment, the video information stored in server 33 for most interactive services consists of less than the amount of information needed for a full motion video type presentation of more than a few seconds. As discussed in more detail below, the information from server 33 for a particular service typically consists of a sequence of still frames, a series of frames providing a limited form of motion or a short full motion sequence of only a few seconds. The server will also store accompanying audio.

The server outputs MPEG II bit streams for the interactive broadband information to an MPEG multiplexer 12'. The multiplexer 12' is similar in structure and operation to the multiplexers 12 discussed above, except that the multiplexer 12' receives data and/or images in bit stream form (rather than packets) and packetizes and multiplexes the data and/or images under real time control by a gateway 31. Although not separately shown, the MPEG multiplexer 12' includes an MPEG II compliant packet assembler. The multiplexer 12' packetizes the image and data input thereto and multiplexes the resultant packets into a 27 Mbits/s (actually 30 Mbits/s including forward error correction bits) MPEG II super transport stream. The transport stream output by multiplexer 12' meets the same specifications and standards requirements as the stream output by each of the multiplexers 12. The information within the stream, however, relates to interactive services and utilizes a larger number of PID values to identify content relating to a larger number of programs, as discussed more fully below.

One or more auto-answer type telephone line modems 32 connect the headend 5 to the PSTN network shown in FIG. 4. The modem(s) 32 provide two-way audio frequency modulation and demodulation of data transported through the PSTN, e.g. via the cellular telephone links, as discussed above. For selecting individual interactive services and for making selections or other interactive inputs relating to many selected services, demodulated upstream signaling messages go from a modem 32 to the gateway 31. The modem also modulates data from the gateway 31 for transmission back through the PSTN and cellular link to the terminal.

The gateway 31 is a computer which controls operation of the interactive headend system in response to subscriber inputs and software programming stored in the gateway computer. For example, in response to a particular user input received via a modem 32, the gateway 31 might instruct server 33 to retrieve a particular MPEG encoded image and output that image on a particular port. The gateway 31 would also instruct the MPEG multiplexer 12' to packetize the image on the assigned port and insert a specific PID value in each of the resulting packets. The gateway transmits a message back to the terminal in the customer premises system providing information necessary to capture and process the packets containing the image information, at least including the assigned PID number. The message from the gateway 31 goes back through the modem 32, the PSTN and the cellular network to the customer premises system, as discussed above relative to FIG. 4.

As noted, the gateway 31 may transmit other relatively low speed data back to the customer premises system through the PSTN and cellular communication link. The gateway 31 may transmit information from its internal memory and programming, or the gateway may retrieve data from server 33. The data may relate to text or graphics overlays or software instructions needed to execute certain functions required by particular interactive services. Alternatively, for similar data requiring higher rate throughput, the gateway 31 may provide the information to the MPEG multiplexer 12'. The multiplexer 12' will encapsulate the information as MPEG transport stream packets in the usual manner but will identify the payload as user data.

The interactive headend may also provide access to other networks offering interactive services. In the illustrated example, the headend 5 includes an INTERNET interface 33'. The interface 33' provides a standard connection to the INTERNET. For relatively low speed services, the customer premises system may access this interface 33' through the wireless data communications and one of the modems 32. If as a result of a session through the interface 33', the user selects information requiring broadband transport, the interface 33' will supply that information to the MPEG multiplexer 12' for processing.

If the broadband information from the interface 33' is data, the multiplexer 12' will packetize that data and insert the assigned PID value, in a manner similar to that for data from the gateway 31. If the broadband information from the interface 33' comprises bit mapped images, the interface 33' supplies the information to an encoder 11". The encoder 11" encodes the bit mapped images as MPEG II standard I frames (reference frames) and supplies those frames to the MPEG multiplexer 12'. The MPEG multiplexer 12' packetizes the I frame images and multiplexes the resultant packets into the super transport stream in the same manner as for images from the server 33.

The 27 Mbits/s payload (actually 30 Mbits/s including forward error correction bits) baseband digital output of the MPEG multiplexer 12' goes to another QAM modulator 13 identical to those discussed above. This additional modulator 13 outputs the intermediate frequency signal containing the interactive service information to another one of the upconverters 14. This additional upconverter converts the frequency of the QAM modulated signal up to one of the 6 MHz wide RF channel frequencies in the 50–450 Mhz range which has been assigned to the broadband interactive services. The upconverter 14 in the headend 5 outputs the assigned 6 MHz bandwidth RF channel to the RF combiner 15 for combining with the other 6 MHz RF signals for the broadcast services. The output of the RF combiner in the 50–450 Mhz range therefore includes both the broadcast services and the RF channel carrying the broadband information relating to the interactive services.

A transmission network supplies the combined spectrum signal in the UHF range from the combiner 15 to a number of transmitter systems $17_1$ to $17_N$. The transmitter systems $17_1$ to $17_N$ correspond to the transmitters TX1 to TX4 described above with respect to FIGS. 5A and 5B. Although coaxial cable, wireless microwave relay transmissions or other media could be used, in the preferred embodiment, the transmissions from the headend 10 ride on optical fiber lines $18_1$ to $18_N$. In the preferred embodiment, an electrical to optical converter system 16 converts the signal from combiner 15 into the necessary number of optical signals for transmission over a plurality of optical fibers $18_1$ to $18_N$. An optical to electrical unit 20 (FIG. 6B) at each transmitter site converts the optical signal back to the combined electrical signal and supplies that signal to one of the transmitter systems.

One feature of the present invention relates to the precise timing of the simulcasting, i.e. simultaneous and in-phase broadcasting or concurrent broadcasting with specified time delays or offsets between various transmissions, of the combined spectrum UHF signal from all of the transmitter antennas TX1 to TXN. The optical fiber signal transmission from the headends 5 and 10 to the transmitter systems requires some finite amount of time. Typically, the transmitter systems will not be equi-distant from the headend. In fact, one of the transmitter systems (e.g., the primary transmitter) may be in the same building as the broadcast headend 10. To insure broadcasting with the desired time offsets discussed above, the system shown in FIGS. 6A and 6B therefore includes some form of delay 19 in one or more of the transport lines 18. The delay(s) may take the form of coils of fiber in the optical transport paths so that differences in the time through each path produce the desired delays in transmission. Alternatively, one or more electronic delay devices may be imposed in the relevant paths, either at the headends prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 5A and 5B). One or both of the headends may be close to the central transmitter site TX1, therefore the transport distance to that site would be the shortest. Assume now, for example, that TX4 is the longest distance from the headend and is 15 miles from the central transmitter TX1. The delay produced by delay device 19 at least will equal the difference in the time required to transport optical signals from the headend to those two sites, in the presently preferred embodiment. In some embodiments, the delay device 19 may provide additional delay to compensate for the difference in wireless RF propagation time from the corresponding antennae to any commonly aligned receiving antennae. In this later example, the delay results in a time off-set transmission of the exact same signal from the antennae at the two transmitters TX1 and TX4 of the type discussed in detail in the above incorporated application Ser. No. 08/441,976 (attorney docket no. 680-130C). Similar delays (not shown) may be imposed in the lines 18 to the other transmitter systems as necessary.

FIG. 6B also shows details of the transmitter systems 17, by way of an example. Each transmitter system includes a splitter 21. The splitter 21 together with associated channel selection filters 22 divide the received combined signal (50–450 Mhz) into its constituent 6 Mhz wide RF channels. For each 6 MHz channel in the 50–450 Mhz range, one of the up-converters 24 converts that channel into one of the up to thirty-three available (licensed) channels in the UHF microwave range. An RF power amplifier 23 amplifies each UHF channel.

A delay device may process each channel signal, and by way of example, FIG. 6B shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel. For any given broadcast channel, the broadcasts from the various transmitters exhibit a precise timing relationship. In the preferred embodiment, the broadcast of each channel from all transmitter antennae will occur simultaneously, and in-phase. In the alternate embodiment, the broadcasts of each channel from at least some of the transmitter antennae will exhibit precise timing offsets.

A microwave combiner 25 combines the UHF channel signals back into a combined spectrum signal in the UHF range and supplies that signal to a microwave broadcasting antenna 27. Each transmitting antenna may be an omni-directional antenna or a directional antenna depending on whether the transmitter serves as a primary transmitter or a secondary transmitter. The antenna 27 emits UHF waves to propagate through a portion of the service area. The transmitted microwave signals propagate into substantially overlapping portions of the service area and into some non-overlapping portions of that area, for example in patterns such as shown in FIG. 5A.

The above discussion of the headend and transmission systems is one example of an overall system for providing the substantially simultaneous broadcasts from multiple transmitters having substantially overlapping propagation areas. Other headend and transmitter systems could be used. For example, the headends 5 and 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to digitally delay broadcast transmissions a predetermined amount with respect to some common clock, e.g. from a geo-positioning type satellite system, to achieve the desired synchronous or time-offset transmissions.

Figure 7:
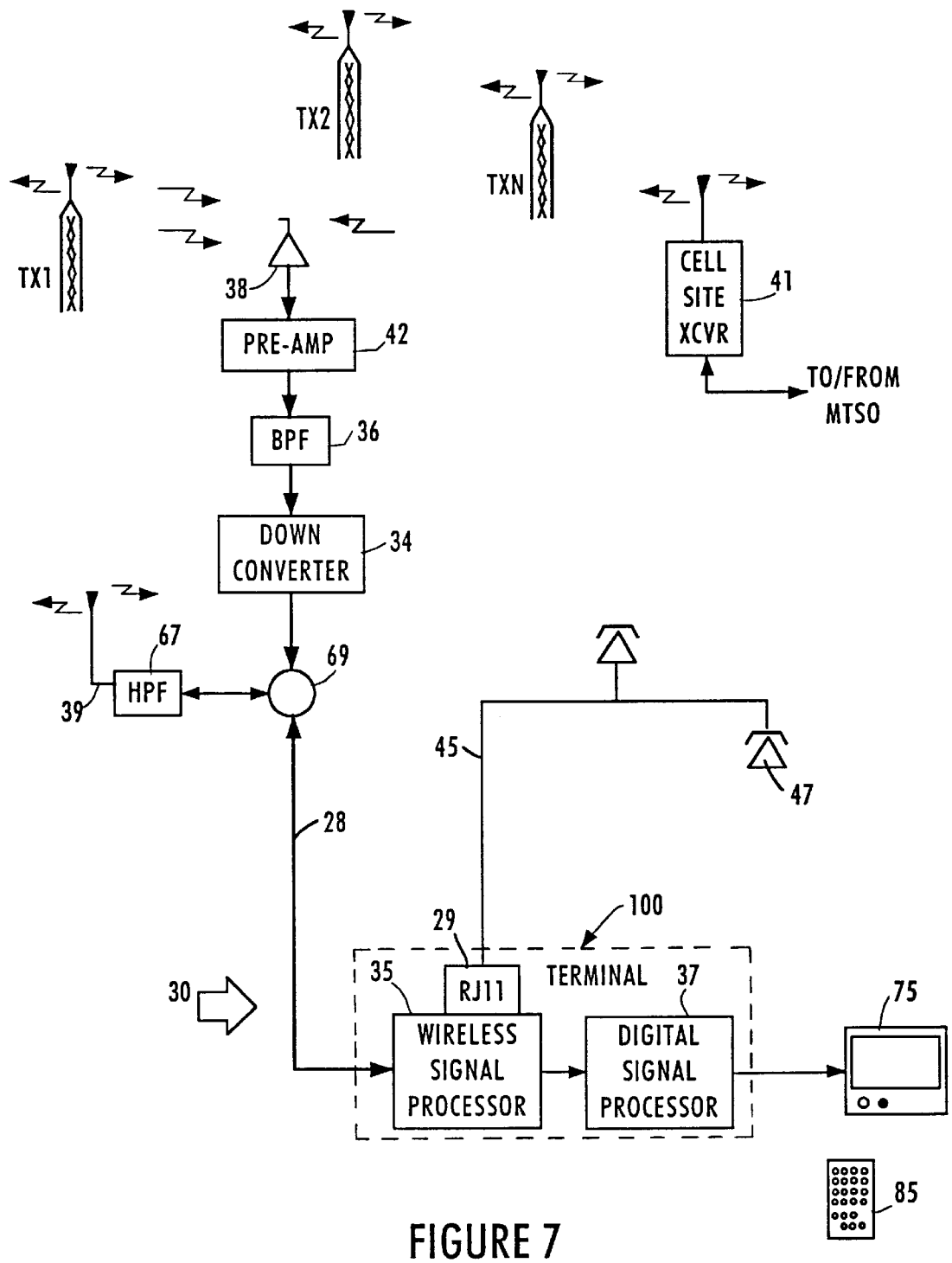
FIG. 7 illustrates the functional elements of a customer premises system used in the combined system of FIG. 4.

FIG. 7 provides a high-level functional diagram of a customer premises receiving system 30 at one subscriber's premises as well as several of the wireless system components in communication with the customer premises system. Each subscriber has a broadband service receiving antenna 38 and a cellular service antenna 39. The broadband antenna receives transmissions in the allotted microwave frequency range. The cellular service antenna 39 sends and receives various data and voice signals over cellular telephone frequency channels separate from the frequencies used for the video channels. In North America, the most common cellular system at present is Advanced Mobile Phone Service (AMPS). AMPS type cellular telephone transmissions, for example, utilize a frequency band in the 800–900 MHz range.

In accord with the preferred embodiment, the receiving antenna 38 is a directional antenna. Typically, the receiving antenna 38 comprises an elliptical dish shaped antenna 18–36 inches long, formed of parallel curved elements. In the preferred embodiment, this antenna has a horizontal field of view (defined by 3 db drop off in signal strength at the boundaries) of approximately 12 degrees. The receiving antenna may have a front-to-back rejection ratio of 30 db or more.

At most potential receiving sites, it will be possible to aim the antenna 38 toward a single one of the transmitters and receive line-of-sight transmissions therefrom. Transmissions from one transmitter, e.g. TX2, may be blocked by an obstruction (not shown), but at many receiving sites line-of-sight transmissions from at least one of the other transmitters, such as TX1, is more likely to be unobstructed.

At installation, the directional antenna 38 is aimed at the one or more of the transmitters TX1 to TXN which produces the strongest received signal through the antenna at the subscriber's particular location. Even so, the antenna receives multiple copies or replicas of the transmitted waveform signals. These multiple copies include a primary direct line-of-sight transmission of a signal from the transmitter the antenna is directed towards together with delayed copies (typically attenuated and distorted) caused by multi-path reflections of the transmissions from one or more of the multiple broadcast sites. Also, at locations where two transmitters fall within the field of view of the receiving antenna 38, the antenna 38 would receive a first copy of the combined spectrum transmission from the closest transmitter as well as a second copy transmitted from the more distant of the two aligned transmitters.

The present invention therefore contemplates inclusion of some form of delay processing in the receiver to compensate for the reception of multiple delayed copies of the transmitted program signals. The presently preferred embodiment discussed below utilizes a delay equalizer. As an alternative, the processing circuitry could utilize spread spectrum technology, as discussed in more detail in commonly assigned U.S. patent application Ser. No. 08/405,685, filed Mar. 17, 1995 (attorney docket no. 680-117) entitled "Television Distribution System and Method." The spread spectrum implementation also reduces the need for direct line-of-sight reception.

The receiving antenna 38 supplies the 2.1 to 2.7 GHz spectrum through a preamplifier 42 and a bandpass filter 36 to a block down-converter 34. The block downconverter converts the 2.1 to 2.7 GHz signal, containing all of the RF channels, back down to the video channel band of 50–450 MHz. The block down-converter supplies the 50–450 MHz combined spectrum signal through a splitter/combiner 69 and a coaxial cable 28 to one or more terminal devices 100 located at various places in the subscriber's home. The coaxial cable carries downstream only signals in the 50–450 MHz range. The coaxial cable also carries two-way cellular communications in a predetermined higher frequency range, e.g. 800–900 MHz assuming use of AMPS type cellular equipment.

The splitter/combiner 69 and an associated two-way high-pass filter 67 permit two-way transmission of signals between the coaxial cable 28 and the second antenna 39. In the preferred embodiment, the cellular signals utilize a portion of the 800–900 MHz frequency band, therefore the filter 67 passes signals above approximately 800 MHz. However, the splitter/combiner 69 and filter 67 block lower frequency signals, e.g. 50–450 MHz signals from the down-converter 34, from passing to the antenna 39. The splitter/combiner 69 blocks passage of signals back upstream toward converter 34 and broadband receiving antenna 38.

Each terminal 100 includes some form of wireless signal processor 35 for processing a selected one of the 6 MHz channels to recover the digitally multiplexed transport stream carried in that channel. Each terminal 100 connects to an associated television set 75. The digital signal processor 37 processes data packets for the selected program from the multiplexed stream to produce signals to drive the TV 75. The TV 75 presents the program to the viewer in sensorially perceptible form, in this case, as a standard audio/visual output.

The wireless signal processor 35 also includes two-way wireless processing circuitry for cellular communications. The cellular circuitry comprises one or more standardized units for obtaining cellular telephone type service through an existing cellular system serving the customer's geographic location. A number of different types of cellular systems are known. In view of the wide availability of AMPS type service in North America, the presently preferred embodiment utilizes an AMPS compliant cellular transceiver. In addition, the processor 35 includes a modem for sending and receiving data over the cellular communication link.

To provide telephone bypass service, the wireless signal processor 35 also includes a landline to cellular interface device. An RJ11 telephone jack connects the interface in the processor 35 to the twisted wire customer premises wiring 45. This interface couples standard telephone line devices 47 (shown for example as telephones) connected to the customer premises wiring 45 to the cellular transceiver within the wireless signal processor 35. When not in use for interactive signaling, one of the telephones 47 can send and receive cellular calls through the wireless signal processor 35. To the telephones 47 connected to line 45, the interface emulates a normal analog telephone loop from a central office switching system. To the cellular transceiver, the interface emulates a standard cellular telephone handset unit, such as is commonly used in mobile cellular telephone installations.

Figure 8:
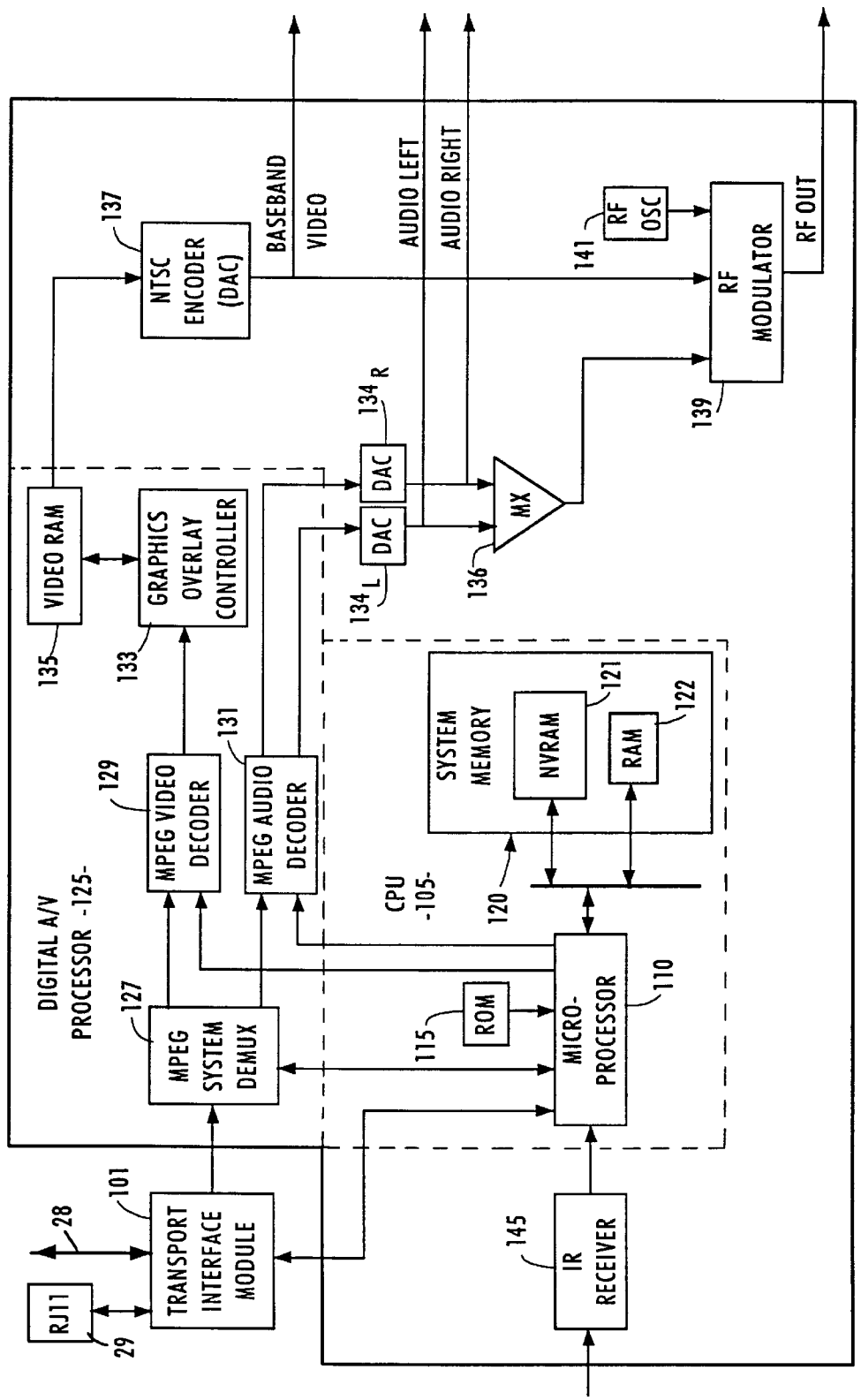
FIG. 8 illustrates in block diagram form the elements of one terminal device used in the system of FIG. 7.

FIG. 8 illustrates the functional elements of the terminal 100. In this embodiment the terminal 100 is a digital entertainment terminal, or 'DET.' The DET 100 will include a transport interface module (TIM) 101 providing the actual physical connection to the coaxial cable network 28 in the subscriber's premises. The transport interface module (TIM) 101 will also perform the format conversion necessary between signal formats utilized by the network and signal formats used within the digital processing portion of the DET 100.

In the present invention, the TIM performs RF tuning and QAM demodulation. If the programming is encrypted, the TIM also includes the necessary decryption circuitry. The TIM 101 also includes a data modem, a landline-to-cellular interface and a cellular transceiver, for two-way signaling communications relating to interactive services. The TIM 101 also provides a telephone line type connection through an RJ11 jack 29 to the customer premises wiring, as discussed above.

The TIM 101 is the wireless signal processor 35. The main portion of the DET 100 serves as the digital signal processor 37.

In the illustrated embodiment, the transport interface module (TIM) 101 presents two connections to the main portion of the DET 100, a high bit rate broadband connection for received broadband signals and a low bit rate signaling connection to permit control and monitoring of the TIM by a microprocessor 110 within the main portion of the DET and two-way communication of signaling messages relating to interactive services. For a selected broadband channel, the TIM hands off the 27 Mbits/s baseband digital transport stream (payload only) captured from that RF channel to the main portion of the DET. The structure of the TIM 101 is described in more detail below with regard to FIG. 9.

The DET 100 includes a CPU 105, comprising a 386, 486 or Pentium microprocessor 110 and associated system memory 120. The system memory 120 may include volatile dynamic RAM 122 and non-volatile RAM 121. The microprocessor 110 includes a small amount of ROM 115 storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 routes packets having specified PID values identified as user data packets to the CPU 105 for further processing. The MPEG system demultiplexer circuitry 127 recognizes program map packets and program association packets and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from iin the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as closed captioning received as user data in the MPEG stream or information received via the signaling data link, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's 135$_L$ and 135$_R$ produce baseband analog audio signals for output to individual baseband output terminals. The audio mixer 136 also receives the baseband audio signals from the DAC's 135$_L$ and 135$_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. The DET may include a built-in keyboard (not shown). In the embodiment illustrated in FIG. 8, the DET 100 includes an infrared (IR) receiver 145. The (IR) receiver 145 responds to inputs signals from a user operated IR remote control device (85 shown in FIGS. 4 and 7) similar to that used today for controlling televisions and video cassette recorders. In response to the IR signals, the receiver 145 produces corresponding digital data output signals. The microprocessor 110 interprets the digital data signals by the IR receiver 145 as input commands. For example, the microprocessor 110 will respond to an appropriate input command from the user to select a broadcast program as discussed in more detail below.

Figure 9:
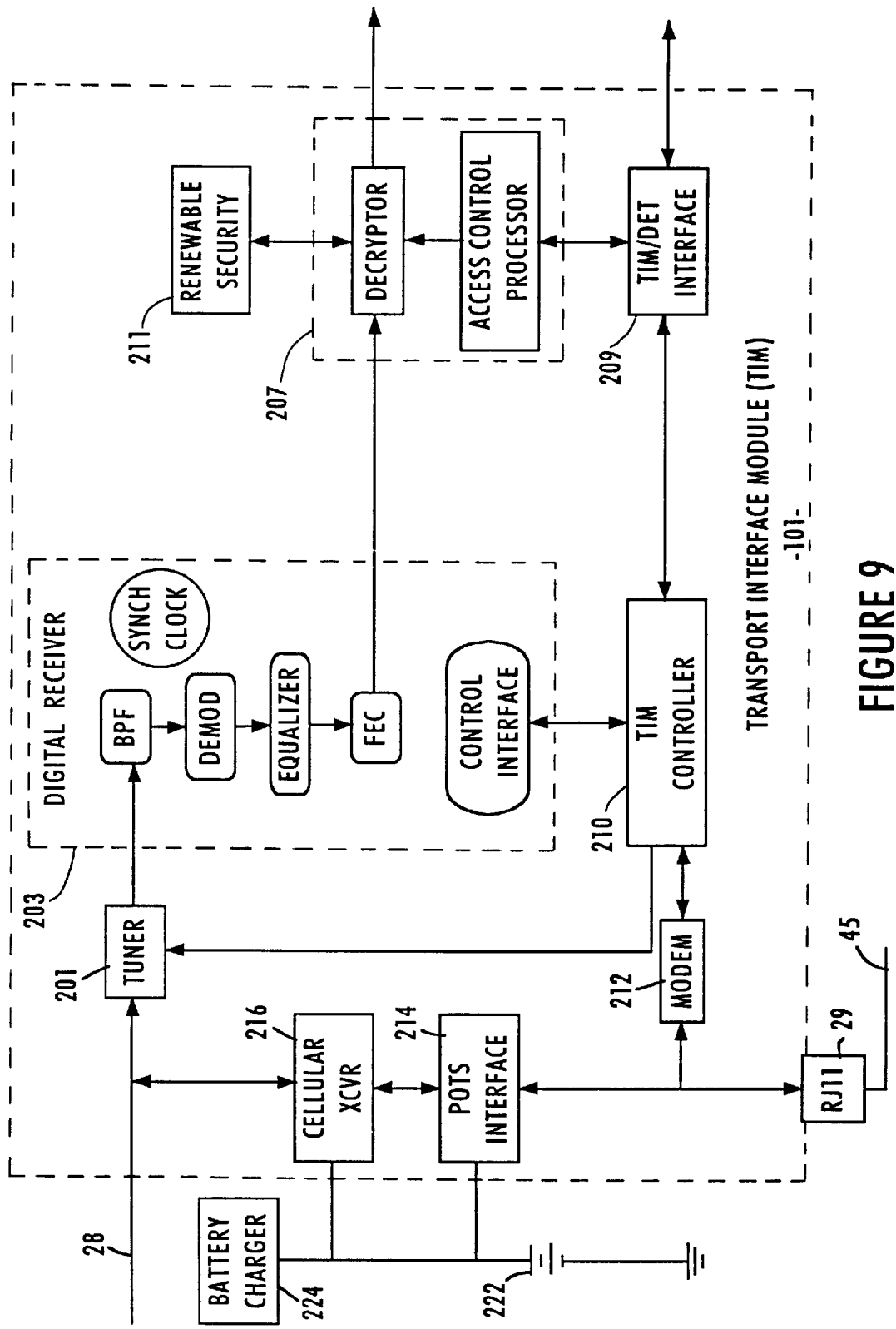
FIG. 9 is a block diagram illustration of the elements of a transport interface module used in the terminal of FIG. 8.

FIG. 9 depicts in block diagram form the structure of a TIM 101. The structure illustrated is based in part on the current preference for the 64 QAM modulation techniques for the digital video signals in transmission system of the type shown in FIG. 6A. The input to the TIM 101 is a broadband RF signal in the 50–450 MHz range provided from a coaxial cable 28 from the down converter 34 (see FIG. 7). The tuner 201 selects a specific 6 MHz channel from the broadband input spectrum and presents it at an intermediate frequency to the digital communications receiver section 203.

The digital receiver 203 includes a band-pass filter, a demodulator (e.g. 64 QAM), a time domain adaptive digital equalizer, and forward error correction circuitry. A clock circuit provides synchronization for the digital output of the demodulator, the adaptive digital equalizer, and the forward error correction circuitry.

The time domain adaptive digital equalizer receives the output of the QAM demodulator. Because of the multi-path delays and possibly offset arrival of the overlapping transmissions from multiple transmitter sites, the output of the demodulator will not be a clean digital pulse stream. Instead, the signal will be a composite of time delayed copies of the transmitted digital information. The time domain adaptive equalizer includes a multi-tap digital delay line, the length of which defines the time window of the delay equalizer. The outputs from the taps of the delay line may be weighted and summed, and the sum processed by a level detector or the like to recapture the original symbols (e.g. 1s and 0s of a digital stream) . Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used. The forward error correction circuit processes the recaptured symbols (e.g. 1s and 0s) to determine if each is in the proper position in the stream.

A control interface provides appropriate control signals to the elements of the digital receiver 203 in response to instructions from the transport interface module (TIM) controller 210. The digital receiver processes signals selected from one of the RF channels by operation of the tuner 201 to capture one of the digital transport streams (e.g. only 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. As discussed more below, the TIM controller 210 may also receive decryption information as signaling messages, via the cellular network and the modem 212. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The CPU 105 also sends and receives messages relating to interactive services to the TIM controller 210 via the TIM/DET interface 209. The TIM 101 includes a data modem 212 of a type normally capable of connection to and communication through a standard analog telephone line. The modem 212 interfaces to the TIM controller 210 via a standard data interface, such as an RS232 interface. The modem 212 also connects through a twisted wire pair to an interface 214, which provides an interface between a POTS type twisted wire pair and a standard cellular transceiver 216. The cellular transceiver 216 in turn connects to the coaxial cable 28 within the customer premises. The modem 212 sends and receives data messages through the POTS interface 214 to the cellular transceiver 216. The cellular transceiver 216 sends and receives voice frequency information modulated in the relevant cellular telephone RF frequency range via the coaxial cable 28 and the second antenna 39, including the modulated data messages sent and received by the modem 212.

The landline POTS interface 214 provides a two-wire telephone connection to the modem 212 and to an RJ11 telephone jack 29. Through the two-wire connection, the interface 214 emulates a POTS type analog telephone loop from an end office type telephone switching system. The POTS interface 214 provides line voltage, dial-tone, off-hook detection, digit collection and processing, ringing signal generation, etc., over the two-wire connection to the modem 212 and the customer premises wiring 45. The interface 214 also provides all necessary protocol and/or signal format conversions between the signals on the two-wire line side and the signals going to and from the cellular transceiver 216. For example, assuming that the transceiver 216 is AMPS compliant, the interface 214 will detect dial pulse or DTMF digits representing a telephone number, recognize the end of digit input, and then supply the number as a digit string followed by a 'SEND' command over the appropriate input connection to the cellular transceiver 216. Such an input causes the transceiver to initiate an outgoing call through a cell site transceiver 41, the MTSO 43 and the PSTN 51. U.S. Pat. No. 4,658,096 to West, Jr. et al. discloses an early example of the POTS interface 214.

When a user at the customer premises wants to initiate an interactive session, the user enters an appropriate command on the remote control 85. In response to the remote control signal, the microprocessor 110 provides a corresponding instruction to the TIM controller 210 via the TIM/DET interface 209. The instruction commands the TIM to initiate a call to the interactive service headend 5. In response, the TIM 210 provides a telephone number of the headend 5 to the modem 212 with instructions to initiate dialing. The modem 212 initiates an off-hook condition on the two-wire connection to the POTS interface 214 and outputs the telephone digits, e.g. in DTMF format. The interface 214 detects digits representing a telephone number, recognizes the end of digit input, and then supplies the number as a digit string followed by a 'SEND' command to the cellular transceiver 216. In response, the transceiver 216 initiates a call through the cell site transceiver 41, the MTSO 43 and the PSTN 51 to the headend 5.

The cellular transceiver 216 communicates via wireless transmission and reception through antenna 39. Because the installation is fixed, the wireless communication will generally go through a single cell site transceiver 41 which serves the area in which the particular system 30 is located. The fixed installation also allows use of a telephone line type data modem, instead of a more sophisticated cellular modem designed to compensate for problems encountered in data communications to and from mobile units, such as loss of signal during handoff between cells.

In response to the telephone number, the cellular transceiver 216 initiates a signaling sequence with the serving cell site transceiver 41 and the MTSO 43 to obtain an available two-way wireless link through the transceiver and initiate a landline connection from the transceiver 41 through the MTSO 43 and the PSTN 51 to the interactive headend 5. The cellular telephone call is set up and provides the same two-way voice grade channel bandwidth as provided for a normal cellular telephone call from a cellular telephone. The modem 210, however, provides two-way modulated data communications over the voice grade cellular link.

One of the modems 32 at the headend 5 answers the incoming telephone call and initiates a handshake procedure. The gateway 31 may send and receive data messages through the resulting communication link to execute a subscriber identification and/or PIN number security procedure. Once these various procedures are complete, the DET 100 can send and receive data to and from the interactive headend 5 via the cellular telephone call link. The downstream data may relate to control functions, such as decryption; or the downstream data may represent text or graphical information for presentation to the user. The upstream data typically relates to user inputs.

For example, if the user inputs a page selection using the remote control 85 during a catalog type interactive session, the infrared transceiver 145 supplies that input to the microprocessor 110. In response to the page selection, the microprocessor 110 formulates an appropriate message and forwards that message via the interface 209 to the TIM controller 210. The TIM controller 210 in turn forwards the message to the RF modem 212. The modem formats the message as required for the particular communication and modulates the message in the voice frequency range, for telephone line type transmission. The modem supplies the modulated message through the interface 214 to the cellular transceiver 216. The cellular transceiver 216 in turn modulates the voice frequency information (in this case modulated data) using the assigned frequency and appropriate modulation techniques utilized on the particular cellular network and applies the modulated RF signal to the coaxial cable 28.

The coaxial cable 28 carries the upstream modulated signal to the splitter/combiner 69 (FIG. 7). The splitter/combiner 69 and low pass filter 67 supply the modulated RF signal to the antenna 39 for wireless transmission to one of the cell site transceivers 41. The cell site transceiver 41 demodulates the RF signal to capture the voice frequency information and forwards that information over telephone channels through the MTSO 43 and the PSTN 51 to the modem 32 in the interactive headend 5. The modem 32 demodulates the voice frequency signal to recapture the data message and forwards the page selection to the gateway 31 for further processing.

In the reverse direction, the modem 32 modulates data messages from the gateway 31 or other components of the headend 5, such as a PID value needed to capture the selected page, and transmits the message over a telephone line of the PSTN 51. The message goes through the established call connection through the PSTN 51 and the MTSO 43 to the cell site transceiver 41 serving the particular customer. The cell site transceiver 41 modulates and broadcast the return message using the appropriate modulation technique and the assigned frequency.

The antenna 39 receives the broadcast signal and supplies that signal through the low pass filter 67 and the splitter/combiner 69 to the in-home coaxial cable 28. The cellular transceiver 216 receives and processes the relevant portion of the frequency spectrum (e.g. portions of the 800–900 MHz range) from the coaxial cable 28. The cellular transceiver 216 demodulates the RF signal to recapture the voice frequency information from the assigned cellular channel (in this case, including the modulated data from the modem 32). The transceiver 216 supplies the voice frequency information through the interface 214 and the two-wire connection to the modem 212. The modem 212 demodulates the data and passes the message over the RS232 or other interface to the TIM controller 210.

The TIM controller 210 may process the message, if appropriate, e.g. if the message relates to a decryption function. Alternatively, the TIM controller will pass the message through the TIM/DET interface 209 to the microprocessor 110 in the main portion of DET 100.

Messages transferred to the microprocessor 110 may relate to display information, e.g. text or graphics for overlay on video information displayed by the DET 100 on the associated television 75. The messages may also relate to instructions to the DET, for example to capture and process packets having a predetermined PID in a particular manner to display a selected page of catalog information included in the broadband stream of data for interactive services.

When a user at the customer premises wants to initiate a telephone call, the user takes a station 47 off-hook. The interface 214 connected to the customer premises wiring 45 through RJ11 jack 29 detects the off-hook and supplies dial tone. The user then dials in the telephone number digits in the normal manner. The POTS interface 214 detects digits representing a telephone number, recognizes the end of digit input, and then supplies the number as a digit string followed by a 'SEND' command to the cellular transceiver 216. In response, the transceiver 216 initiates a call through the cell site transceiver 41 and the MTSO 43. The telephone calls may go through the local PSTN 51, but preferably some if not all of the landline calls go through the alternate network 51'.

For this telephone call, the cellular transceiver communicates via wireless transmission and reception through antenna 39 with the cell site transceiver 41 and the MTSO 43 in exactly the same manner as discussed above relative to the interactive service call example. In response to the telephone number, the cellular transceiver 216 initiates a signaling sequence with the serving cell site transceiver 41 and the MTSO 43 to obtain an available two-way wireless link through the transceiver and initiate a landline connection from the transceiver 41 through the MTSO 43 and the alternate PSTN 51' to the destination telephone. The cellular telephone call is set up and provides the same two-way voice grade channel bandwidth as provided for a normal cellular telephone call from a cellular telephone.

Once the called party answers, the network will carry two-way voice communications between the calling station 47 and the called destination station. Voice signals from the station 47 go through the RJ11 jack and the POTS interface 214 to the cellular transceiver. The cellular transceiver 216 in turn modulates the voice information using the assigned frequency and appropriate modulation techniques utilized on the particular cellular network and applies the modulated RF signal to the coaxial cable 28.

The coaxial cable 28 carries the upstream modulated signal to the splitter/combiner 69 (FIG. 7). The splitter/combiner 69 and low pass filter 67 supply the modulated RF signal to the antenna 39 for wireless transmission to one of the cell site transceivers 41. The cell site transceiver 41 demodulates the RF signal to capture the voice frequency information and forwards that information over telephone channels through the MTSO 43 and the PSTN 51' to the destination station for presentation to the called party.

In the reverse direction, the called party's station supplies the called party's speech information over a telephone line connected to the alternate PSTN 51'. The called party's speech goes through the established call connection through the alternate PSTN 51' and the MTSO 43 to the cell site transceiver 41 serving the particular calling customer. The cell site transceiver 41 modulates and broadcasts this speech information using the appropriate modulation technique and the assigned frequency.

The antenna 39 receives the broadcast signal and supplies that signal through the low pass filter 67 and the splitter/combiner 69 to the in-home coaxial cable 28. The cellular transceiver 216 receives and processes the relevant portion of the frequency spectrum (e.g. portions of the 800–900 MHz range) from the coaxial cable. The cellular transceiver 216 demodulates the RF signal to recapture the voice frequency information from the assigned cellular channel (in this case, speech information). The transceiver 216 supplies the voice frequency information through the interface 214, the RJ11 jack 29 and the customer premises wiring 45 to the calling station 47.

The cellular transceiver 216 processes cellular call related signaling messages exactly as does a standard cellular telephone. In particular, the transceiver 216 monitors paging or signaling messages on the cellular wireless communications and responds to an addressed paging signal representing an incoming call. The transceiver 216 interacts with the cell site transceiver 41 and the MTSO 43 to receive the incoming call.

The transceiver 216 will provide an appropriate signal indicating the presence of the incoming call to the POTS interface 214. In response, the interface 214 will apply a ringing voltage to the two-wire connection. The modem 212 could answer the call, but under most circumstances will not. Instead, the ringing voltage passes through the RJ11 jack 29 and the customer premises wiring 45 to the telephone stations 47 causing those stations to ring.

When the user answers the incoming call by lifting the handset of one of the stations 47, a ring-trip detector in the POTS interface 214 senses this state transition and terminates the ringing voltage. The interface 214 signals the answer condition to the cellular transceiver and provides a two-way voice analog circuit between the two-wire connection (in this case, to the telephone 47) and the voice frequency processing circuitry of the cellular transceiver 216. The cellular transceiver 216 then provides an answer message to the cellular network, and two-way voice communication commences on the assigned frequency channels.

In some installations, the user will maintain a local loop connection to the PSTN and provide some form of switch mechanism to selectively couple the telephone stations 47 to the loop connection to the PSTN and the cellular based bypass service through the terminal 100. In some installations, however, the cellular based telephone service will provide the only telephone communication that the subscriber has. In such an installation, it is important to provide reliable telephone service at all times. In this regard, the telephone services should not be susceptible to power system failures. Accordingly, the terminal includes or connects to a back-up battery 222 which provides power to the POTS interface 214 and the cellular transceiver 216 in the event of a power failure. When the power mains system is active, a battery charger 224 maintains the charge on the back-up battery 222.

Broadcast Service Selection

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 75 and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map stored in the system memory 120. The microprocessor 110 supplies a message containing the RF channel number and the program number (PN) to the TIM controller 210 via the TIM/DET interface 209. In response to the RF channel number, the TIM controller 210 activates the tuner 201 to tune to the identified channel. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the MPEG packets of the selected program. As a result, the TIM 216 passes digital signals from the RF channel through the interface to the MPEG system demultiplexer 127 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected program for presentation to the user via the associated television set 75.

The system of the present invention also facilitates real time impulse pay per view of broadcast programs. To order a pay-per-view event, the user would indicate a purchase request to the DET 100 via appropriate activation of the remote control 75. The microprocessor 110 supplies a purchase request message to the TIM controller 210 via the interface 209. The TIM controller 210 first instructs the RF modem to execute a sequence of steps to initiate a data call, albeit through the cellular network and the PSTN, to the gateway 31. The gateway 31 and the DET 100 exchange a series of messages via the established data link to validate the identity of the terminal and authorization for a user of the terminal to purchase pay-per-view events.

If authorized to purchase an event, the gateway 31 and the terminal 100 exchange messages to identify the event. The event may be the program currently selected by the user. Alteratively, the gateway 31 may transmit back text or graphics information soliciting an event selection.

After selection, the gateway 31 instructs the DET 100 to display a message requesting confirmation of the purchase of the particular event, and the DET forwards a confirmation input by the user up through the data link to the gateway 31. The gateway then transmits back the decryption information necessary to decode the particular pay-per-view event. This information includes at least a decryption key and preferably includes the MPEG program number (PN) for the event. The gateway 31 also records the event purchase in the subscriber's billing account.

The TIM controller 210 utilizes the RF channel number from the DET system memory 120 to activate the tuner 201 to tune to the identified channel. The TIM 101 uses the MPEG program number (PN), the program association table in the packet identified by PID 0 and the program map to identify the packets carrying audio, video and data (if any) for the program. The decryption module 207 uses the decryption key received from the gateway 31 to descramble the information in the payloads of the packets of the pay-per-view program. As a result, the TIM 216 passes digital signals from the RF channel through the interface to the MPEG system demultiplexer 127 in the main portion of the DET wherein the information for the selected pay-per-view program is now in unencrypted form.

The MPEG demultiplexer 127 supplies information from the PID 0 packet, i.e. the program association table to the CPU 105. The microprocessor 110 uses the program number (PN), e.g. from the gateway 31, to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected pay-per-view event for presentation to the user via the associated television set 75.

The above discussion has concentrated on the preferred embodiment which broadcasts video programming. It should be noted, however, that the system may additionally transport other types of programming, such as audio, data and/or telemetry.

Interactive Services Through a Broadband Channel

When a user selects an interactive service, the DET 100 will initiate a cellular telephone type data call to the gateway 31 in the interactive headend 5, as discussed above. The gateway 31 will execute an authentication routine to determine the identity of the calling terminal 100 and determine whether that terminal currently is authorized access to the interactive services offered by the headend 5. The gateway 31 will also initiate any records necessary to bill the end user for the interactive session.

Once the session is set up, the gateway 31 and the DET 100 can exchange data messages relating to an interactive service. The gateway may respond by sending data back through the cellular telephone call connection. In response to at least some messages from the DET 100, the gateway 31 will control other elements of the headend 5 to transmit selected information through a broadband channel to the calling DET 100 for presentation via the television set 75.

Because of the capacity to carry broadcast digital video signals, the use of the DET 100 in the network of FIG. 4 offers an extremely wide range of broadcast services. As noted above, full motion interactive services, such as video-on-demand, could be available through the network. However, full motion interactive video ties up bandwidth which would otherwise carry a full digitally encoded broadcast program, for the entire length of the interactive session. Accordingly, only a small number of subscribers could access such interactive services at any one time. The present invention therefore provides broadband interactive services to a larger number of subscribers by manipulating the DET to capture and display individual frames and/or short sequences of frames. Each such frame uses only a very small portion of the transport capacity in one super transport stream. The frames could be interspersed within the streams containing the broadcast programs, but in the preferred embodiment illustrated in FIG. 6A, these frames are carried in a separate transport stream and on a separate RF channel. Such interactive services allow many subscribers to access information transported in the one digital stream.

In a network offering interactive services using less than full motion real time broadband capacity, the still frame, full motion video segments and graphic image services are all provided by the interaction of three distinct systems, the transport system, the DET hardware and operating system and application software code stored in or downloaded to the DET. The application software code will manage the viewer interface and present to the viewer the content contained in the MPEG II elementary streams and in the messages carried over the cellular data signaling link, as discussed in detail above.

For a service offered through the interactive headend 5, the receiving operation of the terminal 100 is generally similar to that for the broadcast services discussed above except that the terminal receives and processes a limited number of frames of audio, video and data information, instead of a lengthy full motion audio/video sequence. In a full motion video type service, such as the broadcast services, the audio/video processor 125 typically will process thirty frames per second of video in addition to accompanying audio information. For the interactive services, the audio/video processor 125 may process a short sequence of full motion information, e.g. several seconds up to thirty seconds, but normally that processor receives and processes frames at lower rates.

More specifically, the TIM 101 will select and process the RF channel in the 50–450 MHz range carrying the interactive broadband information from the headend 5 in precisely the same manner as for one of the RF channels in that range carrying broadcast programming. The TIM 101 hands off the 27 Mbits/s transport stream to the MPEG system demultiplexer 127. The MPEG system demultiplexer 127 selects certain packets by PID value and supplies the payload information therefrom to the appropriate decoders 129 and 131. However, for still frame or limited motion sequences, the packets occur relatively infrequently in the super transport stream and represent only a single video frame or a short sequence of video frames.

In operation, the video decoder 129 processes a frame and supplies the frame information to the video PAM 135 in the normal manner. The frame remains in the RAM 135 until it is replaced. In a full motion sequence, the frame is replaced immediately after one readout thereof. However, for a limited motion sequence or still frame display, the frame remains in the RAM 135 for longer than one read cycle. The frame in the RAM 135 therefore is repeatedly cyclically output from the RAM 135 to the NTSC encoder 137 until replaced by a subsequent video frame from the video decoder 129. The repeated output of the one frame produces a still or freeze frame type image on the associated television 75.

The following are two methods by which a service provider offers frame or catalog-type services over the network of FIGS. 4, 6A, 6B and 7 using the DET discussed above. Multiple methods may be incorporated by one provider during a single interactive session.

One approach for providing interactive sessions with many viewers involves cyclic transmission of large numbers of frames from the server 33 over one of the digital broadcast channels. The service provider causes the server 33 to place its program content (e.g., a catalog) in a finite number of MPEG I-Frames or pages output through the multiplexer 12', the modulator 13 and upconverter 14 for broadcast transmission on the assigned one of the RF channels. The server 33 continuously loops through all of the pages in the catalog for broadcasting as part of the transport stream carried on that channel. The broadcast transport stream effectively forms a repeating data carrousel of packets relating to a series of pages or images and associated audio and/or data.

With this interactive service, when a viewer initiates the interactive session, the viewer's action in choosing to go interactive causes the DET 100 to initiate an interactive session with the viewer using the cellular network based signaling call, as discussed above. The gateway 31 executes a handshaking routine to verify the identity of the terminal 100 through messages exchanged cellular telephone call. After handshaking, the gateway 33 instructs the DET 100 through the signaling link to tune to the RF channel and demodulate the information on that channel. The gateway 33 may also provide instructions to decrypt selected packets from the transport stream on that channel.

A PID number identifies one repeating program stream within the digital channel, and various individual frames in that stream can be identified by frame number (encoded as part of the header). There may be only one repeating program stream (one PID) on the digital channel slot, or a plurality of repeating streams (PID's).

The gateway 33 initially issues a command through the signaling link to the DET 100 to capture and freeze on an introductory I-Frame selected by the provider (identified by PID and frame number) from the cyclical transmission. The menu presented by that frame could be a navigation menu or a catalog index or the like.

As the viewer makes subsequent selections via the remote control 85 and DET 100, the gateway 31 would issue frame number commands (and new PID value commands if needed) through the signaling link to the DET 100, to capture and lock up display on the newly selected I-Frames or pages from the cyclical stream of frames or pages. Audio frames would be captured, decoded and output in a similar manner. Each individual viewer may see a different individual frame from the cyclical transmission for some finite period of time. At any one time, however, a number of viewers may elect to view the same I-frame from the broadcast data stream. One example of a page which is often viewed by many users, often at the same time, would be the initial menu or introductory frame for the particular service.

This scheme allows a single repeating sequence carried on one channel to serve all viewers. The number of frames or pages per second that can be transported is limited only by the channel bandwidth or transport payload capacity available for this service. For any given bandwidth or payload capacity, the number of frames is limited only by the length of time in a full cycle of the available pages. A longer cycle time increases the number of pages, but it also increases the average time to cycle through to a desired frame, capture the frame and display the image to the user.

Another approach to interactivity using a limited amount of broadband channel capacity involves dynamic sharing of one of the digital channel slots. With this interactive service, when a viewer initiates the interactive session, the viewer's action in choosing to go interactive again causes the DET 100 to initiate an interactive session with the headend 5 via the cellular telephone network. The gateway 31 again executes a handshaking routine to verify the identity of the terminal 100 through messages exchanged via the cellular call connection. After handshaking, the gateway 31 instructs the DET 100 to tune to the RF channel carrying the particular interactive service. The channel may be different but preferably is the same as that carrying the cyclical frame transmissions in the catalog service example discussed above.

The gateway 31 assigns a PID to the viewer, preferably for the duration of the interactive session. The gateway 31 supplies this assigned PID value to the server. The gateway 31 also supplies the PID value and any necessary decryption information to the DET 100, using the signaling link through the cellular data call. The DET 100 can now begin capturing and processing packets bearing the assigned PID value from the transport stream on the particular RF channel.

The PID value assignment technique may be used to download application software and/or a limited number of frames for use in the interactive session. In a typical example, a download at the beginning of a session would include both software code and one or more frames of image information. Subsequent downloads would include additional images and infrequently may include some new software code needed to continue the interactive session.

More specifically, the gateway 31 outputs application software to the MPEG multiplexer 12' and instructs that multiplexer to encapsulate the software code in packets having a specified PID value. The multiplexer 12' includes the packets having the software code and the assigned PID value as part of the 27 Mbits/s super transport stream broadcast via the assigned channel. The software transmission may be a cyclically repeating transmission or a one time transmission, e.g. as packets interspersed among repeating packets of the MPEG data carousel. The transport stream is broadcast on one of the RF channels and processed by the TIM 101 in exactly the same manner as transport streams for one of the broadcast service channels.

Using the data link via the cellular telephone call, the gateway also provides necessary decoding information to the terminal 100. The gateway 31 at least supplies the PID value assigned to the software downloading operation. If the software information is encrypted, the gateway 31 also supplies the decryption key. As noted above, the TIM 101 has been instructed to tune the relevant RF channel. Using the RF channel, the PID value and the decryption information, the TIM selects the RF channel and processes the packets having the specified PID value in order to hand off to the main portion of the DET the 27 Mbits/s digital transport stream from the RF channel through the interface to the MPEG system demultiplexer 127 in the main portion of the DET, wherein at least the information in the packets identified by the assigned PID value is now in unencrypted form.

In the main portion of the DET, the MPEG system demultiplexer 127 captures the packets identified by the assigned PID value. Those packets containing software code are identified as user data, and the MPEG system demultiplexer 127 passes the payload information from those packets to the microprocessor 110. The microprocessor recognizes the information as software code and stores the code in the RAM 122 as application programming. After completion of the downloading of the software to the RAM 122, the microprocessor 110 begins executing application code included in that software. The application code controls operation of the DET 100 for the duration of the interactive session or until the code is written over by newly downloaded code.

Commonly assigned U.S. patent application Ser. No. 08/380,755 filed on Jan. 31, 1995 (attorney docket no. 680-083C) entitled "Digital Entertainment Terminal with Channel Mapping" and commonly assigned U.S. patent application Ser. No. 08/250,791 filed on May 27, 1994 (attorney docket no. 680-083) entitled "Dynamically Programmable Digital Entertainment Terminal" provide more detailed descriptions of techniques for downloading application software through broadband networks, and the disclosures thereof are incorporated herein in their entirety by reference.

As part of the initial download with the application software, the server 33 will transmit one or more frames of video and possibly audio for storage in the system memory 120 of the DET 100. Once the application software and associated images and audio reside in memory in the DET, the DET need not access the broadband link again unless additional broadband information is needed at a particular point in the interactive session. The broadband channel will provide similar application downloads to other terminals and will transport other broadband information to other terminals. The cellular telephone call connection carrying the signaling communications to and from the particular DET 100, however, may remain up for the duration of the interactive session.

The downloaded application software code will control the presentation of the stored frames to the viewer, as well as the communication's protocol through the signaling link to the interactive headend 5. Additional downloads of application code and frames may continue as the viewer moves through the interactive service. Each additional download of images will overwrite in memory the application frames already viewed. The limitation on this method is the amount of available memory in the DET 100.

As the viewer requests pages or the service flow process calls for additional pages, the gateway 31 instructs the server 33 to output I-Frames for those pages or other image frames and instructs the multiplexer 12' to encapsulate all information from those pages or image frames in packets containing the viewer's PID. The multiplexer, modulator and upconverter therefore continues to deliver the I-Frames in MPEG packets identified by the assigned PID over the RF broadcast channel.

The gateway 31 and server 33 may also place a sequence of MPEG frames in transport packets identified by the assigned PID value. The viewer's DET 100 captures and displays each frame identified by the assigned PID. This shared transmission can provide still frame display of each individual I frame as well as display of sequences of limited or full motion video using sequences of MPEG frames.

The gateway and server similarly assign a PID for audio, and the DET captures, decodes and outputs audio information which the server places in MPEG packets identified by the assigned PID. The shared transmission can also be used for subsequent downloading of both application software code and frames for storage and later use.

Depending on the precise nature of the service, the server 33 could be as simple as a PC with an associated storage device, such as a hard disk or CD ROM, storing an appropriate number of individual frames of audio and video data and any application software to be downloaded.

In addition to the catalog service discussed above, the limited bandwidth interactive services can be used alone or in various combinations in a wide variety of applications that require some transport capacity less than that for a long sequence of real-time full motion video. For example, still frames in a data carousel might represent views down a street or a corridor of a mall and the fronts of "stores" selling products or services. As the viewer elects to move from one point to another, an assigned PID transmission approach could be used to transmit a sequence of frames to simulate motion down the street or mall corridor. If the viewer selects a particular store, still frames could be presented to illustrate products in the store in a manner similar to the catalog, but sequences of frames could provide limited motion through the store and/or for providing changing perspective views of selected products. Two-way data transmissions through the signaling link could be used to effectuate actual ordering and credit card payment for items a viewer chooses to buy.

The still frame transmissions discussed above also offer an advantageous low capacity transport for various menus. The menus may relate to broadcast services, e.g. listing the broadcast programs/channels currently offered through the system. Such menus can relate to individual services, such as video games offered via the interactive service channel. The application software downloaded and stored in the DET memory would control the DET's responses to viewer selection of items from each different type of menu. In one specific example, the DET 100 might capture I-frames from the cyclical transmission to obtain a menu of broadcast channels and/or program guide information relating to programs currently available on the broadcast channels. Alternatively, the gateway and server might download several pages of menus and guide information as part of the initial application download procedure when a viewer first begins a particular interactive session.

The above discussions of both the cyclical frame transmission service and the shared digital channel service using assigned PID values assumed transmission of the frames for such services on a digital channel separate from those used for the full motion digital broadcast video services. If the still frame services require transfer of small amounts of broadband information, e.g. a single frame every two seconds or so for a menu or the like, the packets carrying the frame(s) for such a service could actually be periodically interposed among MPEG transport packets for the full motion broadcast video services. For example, if the frame represented a menu of broadcast services, one frame of menu data could be transmitted over each RF channel carrying broadcast services. The menu frame transmission could repeat at relatively long intervals, e.g. once every two seconds or longer. The broadcast service provider might also choose to modify the menu over time to provide up to date information. As a program running in the background of the normal full motion video and audio processing, the DET 100 would capture and store the menu frame in memory each time the DET 100 detected the menu frame. At any time that the user selects display of the menu, the DET 100 would retrieve the frame from memory and provide a display of the most recently received menu information.

Another service which the limited frame transmission techniques might offer would be a travelogue type service. Using either the cyclical transmission technique or the assigned PID value transmission technique, such a service would provide one or more series of still frames depicting a selected foreign locale. Each individual user could pass through the locale in a different manner by selectively obtaining alternate frames from the service. Such a service preferably utilizes both transmission techniques in combination. Initial travel location choices would appear in menu pages transmitted as part of the cyclical transmission and captured as needed by the DET for display. Certain data relating to associated purchase options, e.g. to buy airline tickets and make hotel reservations, might be downloaded and stored in DET memory together with the application program code using an assigned PID number. Transmission of the frames illustrating movement through a selected locale and individual user selected still frame views of that locale would utilize the shared transmission based on a PID number assigned to the viewer's DET. The short motion sequences and still frame views would essentially provide a virtual reality stroll through the selected travel locale. One viewer selecting Paris, France, for example, might choose to stroll through the Louvre museum, whereas another viewer selecting Paris might choose to stroll or ride a boat down the Seine past Notre Dame cathedral. The DET 100 transmits all upstream messages relating to the interactive service, including relevant user input information, via the signaling data call through the cellular telephone network.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. A communication system comprising:

a headend system producing a signal containing multiplexed channels, each channel carrying a transport stream comprising multiplexed streams of digitized broadband information;

at least one broadband wireless transmitter for broadcasting the signal into a service area; and a plurality of receiver systems within the service area, each receiver system comprising:

(i) an antenna for receiving a wireless transmission of the signal, (ii) an interface module processing the received signal to select one of the channels and acquire a transport stream from the selected channel, (iii) a digital signal processing section for processing digitized data from a selected stream of digitized broadband information contained in the acquired transport stream to present selected broadband information, (iv) a modem, and (v) a wireless telephone transceiver, the modem and transceiver providing two-way communication of signaling messages to and from the receiver system via a wireless telephone network, wherein the interface module comprises:

means for selectively receiving the selected channel; and means for demodulating a signal from the selected channel to acquire the transport stream from the selected channel, wherein the modem and transceiver are elements of the interface module.

2. A communication system comprising:

a headend system producing a signal containing multiplexed channels, each channel carrying a transport stream comprising multiplexed streams of digitized broadband information;

at least one broadband wireless transmitter for broadcasting the signal into a service area; and a plurality of receiver systems within the service area, each receiver system comprising:

(i) an antenna for receiving a wireless transmission of the signal, (ii) an interface module processing the received signal to select one of the channels and acquire a transport stream from the selected channel, (iii) a digital signal processing section for processing digitized data from a selected stream of digitized broadband information contained in the acquired transport stream to present selected broadband information, (iv) a modem, and (v) a wireless telephone transceiver, the modem and transceiver providing two-way communication of signaling messages to and from the receiver system via a wireless telephone network, and further comprising:

a control for supplying user input information to the receiver system, and a programmed central processing unit, wherein the programmed central processing unit controls selection by the interface module and the digital signal processing section in response to certain of the user input information and transmits messages through the modem in response to other user input information.

3. A communication system as in claim 2, wherein the modem receives messages via the transceiver and in response thereto supplies information to the programmed central processing unit.

4. A communication system as in claim 3, wherein in response to at least some information supplied by the modem, the programmed central processing unit causes the digital signal processing section to generate a display of said at least some information.

5. A communication system as in claim 1, further comprising an interactive headend system generating one of the transport streams in response to signaling messages from the wireless telephone transceiver.

6. A communication system comprising:

a headend system producing a signal containing multiplexed channels, each channel carrying a transport stream comprising multiplexed streams of digitized broadband information;

at least one broadband wireless transmitter for broadcasting the signal into a service area; and a plurality of receiver systems within the service area, each receiver system comprising:

(i) an antenna for receiving a wireless transmission of the signal, (ii) an interface module processing the received signal to select one of the channels and acquire a transport stream from the selected channel, (iii) a digital signal processing section for processing digitized data from a selected stream of digitized broadband information contained in the acquired transport stream to present selected broadband information, (iv) a modem, and (v) a wireless telephone transceiver, the modem and transceiver providing two-way communication of signaling messages to and from the receiver system via a wireless telephone network, and further comprising an interactive headend system generating one of the transport streams in response to signaling messages from the wireless telephone transceiver, wherein the interactive headend system comprises:

a server outputting selected frames of video information;

a packet data multiplexer for packetizing and multiplexing the selected frames of video information into the one transport stream; and a gateway processor responsive to signaling messages received via the wireless telephone network for controlling the server and the packet data multiplexer.

7. A communication system as in claim 6, wherein:

the server stores and outputs frames of video information in digitized compressed form in MPEG format, and the packet data multiplexer comprises an MPEG multiplexer.

8. A communication system as in claim 5, wherein the interactive headend system comprises an interface to Internet.

9. A communication system as in claim 1, wherein said at least one broadband wireless transmitter comprises a plurality of transmitters located at spaced apart sites transmitting said signal containing multiplexed channels so that areas of propagation from respective ones of the transmitters substantially overlap over each other in at least a major portion or the service area.

10. A communication system as in claim 9, wherein the receiving antenna comprises a directional antenna.

11. A communication system as in claim 1, wherein each receiver system further comprises an antenna coupled to the wireless telephone transceiver for transmission and reception of signals between the wireless telephone transceiver and the wireless telephone network.

12. A communication system as in claim 1, wherein the wireless telephone transceiver comprises a cellular transceiver.

13. A communication system as in claim 12, wherein:

at least one of the receiver systems further comprises a telephone-to-cellular transceiver interface, and said telephone-to-cellular transceiver interface provides two-way signal conversion between signal formats of the cellular transceiver and signal formats used on a telephone line.

14. A communication system as in claim 13, wherein the at least one of the receiver systems further comprises a connection from the telephone-to-cellular transceiver interface to customer premises wiring coupled to a customer premises telephone device.

15. A digital entertainment terminal comprising:

a channel selector for coupling to a broadband receiving antenna and selecting one of a plurality of channels from a signal from the broadband receiving antenna;

a channel signal processor for processing the one channel to acquire a digital transport stream carried on the one channel, said digital transport stream comprising multiplexed streams of compressed, digitized audio and video information;

an audio/video processor responsive to selected compressed, broadband digitized audio and video information from said digital transport stream to produce signals for driving an audio/video display device;

means for receiving inputs from a user;

a wireless telephone transceiver;

a modem coupled to the wireless telephone transceiver for two-way communication of signaling messages via a wireless telephone network; and a control processor controlling operations of the channel selector and the audio/video processor in response to at least some of the received inputs from the user, sending data messages through the modem and the wireless telephone transceiver, and processing data messages received via the modem and the wireless telephone transceiver, wherein the audio/video processor comprises:

an audio/video decoder for decompressing the selected compressed, digital information from the transport stream to produce a decompressed video signal and a decompressed audio signal;

a graphics overlay controller, controlled by said control processor, for generating graphic display information; and means for combining the graphic display information with the decompressed video signal.

16. A digital entertainment terminal as in claim 15, wherein the channel selector comprises an channel frequency tuner.

17. A digital entertainment terminal as in claim 15, wherein the channel signal processor comprises a demodulator.

18. A digital entertainment terminal as in claim 17, wherein the demodulator comprises a QAM demodulator.

19. A digital entertainment terminal as in claim 17, wherein the channel signal processor further comprises forward error correction circuitry.

20. A digital entertainment terminal comprising:

a channel selector for coupling to a broadband receiving antenna and selecting one of a plurality of channels from a signal from the broadband receiving antenna;

a channel signal processor for processing the one channel to acquire a digital transport stream carried on the one channel, said digital transport stream comprising multiplexed streams of compressed, digitized audio and video information;

an audio/video processor responsive to selected compressed, broadband digitized audio and video information from said digital transport stream to produce signals for driving an audio/video display device;

means for receiving inputs from a user;

a wireless telephone transceiver;

a modem coupled to the wireless telephone transceiver for two-way communication of signaling messages via a wireless telephone network; and a control processor controlling operations of the channel selector and the audio/video processor in response to at least some of the received inputs from the user, sending data messages through the modem and the wireless telephone transceiver, and processing data messages received via the modem and the wireless telephone transceiver, wherein the channel signal processor comprises a demodulator, and wherein the channel signal processor further comprises a delay equalizer coupled between the demodulator and the audio/video processor.

21. A digital entertainment terminal as in claim 15, wherein the audio/video decoder comprises:

an MPEG video decoder;

an MPEG audio decoder; and an MPEG demultiplexer for selectively routing MPEG encoded video and audio information carried on the digital broadband channel to the MPEG video decoder and the MPEG audio decoder, respectively.

22. A digital entertainment terminal as in claim 15, wherein the audio/video processor further comprises output means responsive to a signal from the means for combining and the decompressed audio signal for producing at least one output signal for driving a television receiver type audio/video display device.

23. A digital entertainment terminal as in claim 22, wherein the audio/video decoder comprises:

an MPEG video decoder; and an MPEG audio decoder.

24. A digital entertainment terminal as in claim 15, wherein the wireless telephone transceiver comprises a cellular transceiver.

25. A digital entertainment terminal as in claim 15, further comprising a telephone interface coupled to the wireless telephone transceiver, wherein the telephone interface provides two-way signal conversion between signal formats of the wireless transceiver and signal formats used on a telephone line.

26. A digital entertainment terminal as in claim 25, further comprising a connection from the telephone interface to customer premises wiring coupled to a customer premises telephone device.

27. A digital entertainment terminal as in claim 26, wherein the wireless telephone transceiver comprises a cellular transceiver.

28. A digital entertainment terminal comprising:

a channel selector for coupling to a broadband receiving antenna and selecting one of a plurality of channels from a signal from the broadband receiving antenna;

a channel signal processor for processing the one channel to acquire a digital transport stream carried on the one channel, said digital transport stream comprising multiplexed streams of compressed, digitized video information;

a digital processor capable of selectively providing both a full motion video presentation in response to compressed, digitized video information selected from a digital transport stream output by the channel signal processor and a still frame presentation in response to individual frames of compressed, digitized video information selected from a digital transport stream output by the channel signal processor;

means for receiving inputs from a user;

a wireless telephone transceiver;

a modem coupled to the transceiver for two-way wireless communication of signaling data messages via a wireless telephone network; and a control processor controlling operations of the channel selector and the digital processor in response to at least some of the received inputs from the user, sending messages through the modem and the transceiver, and processing messages received via the modem and the transceiver, and further comprising:

program memory for storing software executable by the control processor, wherein:

in response to a command code received via the modem, the control processor causes data selected from a transport stream output by the channel signal processor to be stored in the program memory, and the control processor executes the software received and stored in the memory to control subsequent operations of the digital entertainment terminal.

29. A digital entertainment terminal as in claim 28, wherein the software received and stored in the memory comprises an application program to be executed by the control processor to provide a specific interactive service.

30. A digital entertainment terminal comprising:

a channel selector for coupling to a broadband receiving antenna and selecting one of a plurality of channels from a signal from the broadband receiving antenna;

a channel signal processor for processing the one channel to acquire a digital transport stream carried on the one channel, said digital transport stream comprising multiplexed streams of compressed, digitized video information;

a digital processor capable of selectively providing both a full motion video presentation in response to compressed, digitized video information selected from a digital transport stream output by the channel signal processor and a still frame presentation in response to individual frames of compressed, digitized video information selected from a digital transport stream output by the channel signal processor;

means for receiving inputs from a user;

a wireless telephone transceiver;

a modem coupled to the transceiver for two-way wireless communication of signaling data messages via a wireless telephone network; and a control processor controlling operations of the channel selector and the digital processor in response to at least some of the received inputs from the user, sending messages through the modem and the transceiver, and processing messages received via the modem and the transceiver, wherein the digital processor comprises:

(a) an audio/video decoder for decompressing compressed, digitized audio and video information received over the broadband channel to produce a decompressed video signal and a decompressed audio signal; and (b) a memory for storing at least one frame of compressed, digitized information, wherein the audio/video decoder is responsive to instructions from the control processor to selectively:

(1) decode a series of frames of compressed, digital information to produce decompressed video and audio signals corresponding to the full motion presentation, and (2) repetitively decode the at least one frame stored in the memory to produce decompressed video and audio signals corresponding to the still frame presentation.

31. A digital entertainment terminal as in claim 28, wherein the transceiver comprises a cellular transceiver.

32. A digital entertainment terminal as in claim 28, further comprising a telephone interface coupled to the transceiver, wherein the telephone interface provides two-way signal conversion between signal formats of the transceiver and signal formats used on a telephone line.

33. A digital entertainment terminal as in claim 32, further comprising a connection from the telephone interface to customer premises wiring coupled to a customer premises telephone device.

34. A digital entertainment terminal as in claim 33, wherein the transceiver comprises a cellular transceiver.

35. A communication system comprising:

a headend system producing a signal containing multiplexed channels, each channel carrying a transport stream comprising multiplexed streams of digitized video information;

a plurality of broadband wireless transmitters located at spaced apart sites broadcasting said signal so that areas of propagation from respective ones of the transmitters substantially overlap over each other in at least a major portion of a service area;

a wireless telephone network; and a plurality of receiver systems within the service area, each receiver system comprising:

(i) a directional antenna for receiving a wireless transmission of said signal from one of the transmitters, (ii) a channel selector coupled to the directional antenna for selecting one of the multiplexed channels, (iii) a channel signal processor for processing the one channel to acquire the digital transport stream carried on the one channel, (iv) a digital processor responsive to selected compressed, broadband digitized audio and video information from the acquired digital transport stream to produce signals for driving a video display device, (v) means for receiving inputs from a user, (vi) a wireless transceiver for two-way communication via the wireless telephone network, (vii) a data modem for two-way communication of signaling messages via the wireless transceiver, and (vii) a control processor controlling operations of the channel selector and the digital processor in response to at least some of the received inputs from the user, sending messages through the modem and processing messages received via the modem.

36. A communication system as in claim 35, further comprising an interactive headend system generating one of the transport streams in response to signaling messages received via the wireless telephone network.

37. A communication system as in claim 36, wherein the interactive headend system comprises:

a server outputting selected frames of video information;

a packet data multiplexer for packetizing and multiplexing the selected frames of video information into the one transport stream; and a gateway processor responsive to signaling messages received via a communication link at least partially through the wireless telephone network for controlling the server and the packet data multiplexer.

38. A communication system as in claim 37, wherein:

the server stores and outputs frames of video information in digitized compressed form in MPEG format, and the packet data multiplexer comprises an MPEG multiplexer.

39. A communication system as in claim 37, wherein the interactive headend further comprises an interface to Internet coupled to supply at least some information to the packet data multiplexer.

40. A communication system as in claim 36, wherein the interactive headend system comprises an Internet interface.

41. A communication system as in claim 35, wherein each receiver system further comprises an antenna coupled to the wireless transceiver for transmission and reception of signals between the wireless transceiver and a base station of the wireless telephone network.

42. A communication system comprising:

a headend system producing a signal containing multiplexed channels, each channel carrying a transport stream comprising multiplexed streams of digitized video information;

a plurality of broadband wireless transmitters located at spaced apart sites broadcasting said signal so that areas of propagation from respective ones of the transmitters substantially overlap over each other in at least a major portion of a service area;

a wireless telephone network; and a plurality of receiver systems within the service area, each receiver system comprising:

(i) a directional antenna for receiving a wireless transmission of said signal from one of the transmitters, (ii) a channel selector coupled to the directional antenna for selecting one of the multiplexed channels,

43

(iii) a channel signal processor for processing the one channel to acquire the digital transport stream carried on the one channel, (iv) a digital processor responsive to selected compressed, broadband digitized audio and video information from the acquired digital transport stream to produce signals for driving a video display device, (v) means for receiving inputs from a user, (vi) a wireless transceiver for two-way communication via the wireless telephone network, (vii) a data modem for two-way communication of signaling messages via the wireless transceiver, and (vii) a control processor controlling operations of the channel selector and the digital processor in response to at least some of the received inputs from the user, sending messages through the modem and processing messages received via the modem, wherein the headend system comprises:

(1) a source of a first transport stream containing a plurality of digitally multiplexed packet streams, each packet stream carrying digitized data representing one of a first group of video programs;

(2) a source of a second transport stream containing a plurality of digitally multiplexed packet streams, each packet stream carrying digitized data representing one of a second group of video programs;

(3) a modulation system modulating the first digital multiplexed data stream and the second digital multiplexed data stream into first and second channels, respectively;

(4) and a combiner for combining the first and second channels from the modulating system into said signal containing multiplexed channels.

43. A communication system as in claim 42, further comprising a transmission network for supplying said signal containing multiplexed channels from the headend system to the broadband wireless transmitters.

44. A communication system as in claim 43, wherein the transmission network comprises optical fibers connected between the broadband wireless transmitters and the headend system.

45. A communication network as in claim 35, wherein the wireless telephone network comprises a cellular telephone network.

46. A communication system as in claim 35, wherein:

each of the receiver systems further comprises a telephone interface coupled to the wireless transceiver, and said telephone interface provides two-way signal conversion between signal formats of the wireless transceiver and signal formats used on a telephone line.

47. A communication system as in claim 46, wherein each of the receiver systems further comprises a connection from the telephone interface to customer premises wiring coupled to a customer premises telephone device.

48. A communication system as in claim 47, wherein the wireless telephone network comprises a cellular telephone network.

49. A communication system comprising:

a headend system producing a signal containing multiplexed channels, each channel carrying a transport stream comprising multiplexed streams of digitized broadband information;

an Internet interface coupled to the headend system for supplying at least some data to the headend system for inclusion in one of the transport streams;

44 at least one broadband wireless transmitter for broadcasting the signal into a service area; and a plurality of receiver systems within the service area, each receiver system comprising:

(i) an antenna for receiving a wireless transmission of the signal, (ii) an interface module processing the received signal to select one of the channels and acquire a transport stream from the selected channel, (iii) a digital signal processing section for processing digitized data from a selected stream of digitized broadband information contained in the acquired transport stream to present selected broadband information, (iv) a modem, and (v) a wireless telephone transceiver, the modem and wireless telephone transceiver providing upstream communication of signaling messages from the receiver system to the Internet interface via a wireless telephone network.

50. A communication method comprising:

broadcasting multiplexed channels carrying digitally encoded video information over the air to a plurality of customer premises digital entertainment terminals capable of decoding said encoded video information;

communicating signaling messages relating to interactive services from a first one of the plurality of customer premises digital entertainment terminals via a first selective call through a wireless telephone network; and providing telephone service from a telephone device through a second one of a plurality of customer premises digital entertainment terminals via a second selective call through the wireless telephone network.

51. The communication method of claim 50, wherein each of the first and second selective calls is communicated via a wireless cellular telephone link.

52. A communication method comprising:

broadcasting multiplexed channels carrying digitally encoded video information over the air to a plurality of customer premises digital entertainment terminals capable of decoding said encoded video information;

communicating signaling messages relating to interactive services from one of the plurality of customer premises digital entertainment terminals via a first selective call through a wireless telephone network; and providing telephone service from a telephone device through the one of the plurality of customer premises digital entertainment terminals via a second selective call through the wireless telephone network.

53. The communication method of claim 52, wherein each of the first and second selective calls is communicated via a wireless cellular telephone link.

54. In a digital wireless video system including a headend system capable of broadcasting multiplexed channels carrying digitally encoded video information over the air, a wireless telephone network, and a plurality of customer premises digital entertainment terminals, each terminal being capable of decoding said digitally encoded video information broadcast by the headend system and having a transceiver providing two-way signaling communication and telephone service via the wireless telephone network, a method comprising:

communicating signaling messages related to the broadcast video information from a first one of the plurality of customer premises distal entertainment terminals via the wireless telephone network; and providing two-way telephone service between a calling party and a called party from one of said first one and a second one of the plurality of customer premises digital entertainment terminals via the wireless telephone network.

55. The method of claim 54, further comprising the stop of:

broadcasting multiplexed channels carrying digitally encoded video information from the headend system over the air to the plurality of customer premises digital entertainment terminals.

56. The method of claim 54, wherein said wireless telephone network includes a wireless cellular telephone link.

* * * * *

UNITED STATES PATENT AND TRADEMARK OFFICE
CERTIFICATE OF CORRECTION

PATENT NO. : 5,822,324
DATED : October 13, 1998
INVENTOR(S) : Bruce KOSTRESKI et al It is certified that error appears in the above-indentified patent and that said Letters Patent is hereby corrected as shown below:

Item [75]

On the cover page, under Inventors, change "Kostresti" to --Kostreski--

Signed and Sealed this

Second Day of March, 1999

*Attest:*

Q. TODD DICKINSON

*Attesting Officer*  Acting Commissioner of Patents and Trademarks